United States Patent [19]

Rody et al.

[11] Patent Number: 4,894,399

[45] Date of Patent: Jan. 16, 1990

[54] LIGHT-STABILIZED POLYMER MICROPARTICLES CONTAINING EPOXY GROUPS

[75] Inventors: Jean Rody, Riehen; Mario Slongo, Tafers; Franciszek Sitek, Therwil, all of Switzerland; Andreas Valet, Eimeldingen, Fed. Rep. of Germany

[73] Assignee: Ciba-Geigy Corporation, Ardsley, N.Y.

[21] Appl. No.: 202,724

[22] Filed: Jun. 3, 1988

[30] Foreign Application Priority Data

Jun. 4, 1987 [CH] Switzerland ............ 2113/87

[51] Int. Cl.$^4$ ............................. C08K 5/34
[52] U.S. Cl. ......................... 524/91; 524/99; 524/102; 524/103; 524/291; 524/336; 525/902
[58] Field of Search ............ 524/91, 99, 102, 103, 524/291, 336; 525/902, 208

[56] References Cited

U.S. PATENT DOCUMENTS

| | | |
|---|---|---|
| 3,272,891 | 9/1966 | Millionis et al. ............ 524/91 |
| 3,313,866 | 4/1967 | Horton .................... 524/291 |
| 3,342,850 | 9/1967 | Newland et al. ........... 524/291 |
| 3,880,796 | 4/1975 | Christenson ............... 524/461 |
| 4,290,932 | 9/1981 | Wright et al. ............. 524/522 |
| 4,414,372 | 11/1983 | Farnham et al. .......... 526/190 |
| 4,508,880 | 4/1985 | Webster ................... 526/190 |
| 4,522,990 | 6/1985 | Andrews .................. 526/180 |
| 4,618,638 | 10/1986 | Dexter et al. ............. 524/102 |
| 4,695,607 | 9/1987 | Spinelli .................... 525/293 |

FOREIGN PATENT DOCUMENTS

| | | |
|---|---|---|
| 0003166 | 7/1979 | European Pat. Off. . |
| 028886 | 5/1981 | European Pat. Off. . |
| 0119051 | 9/1984 | European Pat. Off. . |
| 2818102 | 2/1978 | Fed. Rep. of Germany . |
| WO86/00626 | 1/1986 | PCT Int'l Appl. . |
| 1156012 | 6/1969 | United Kingdom . |
| 1538151 | 1/1979 | United Kingdom . |
| 2124636 | 2/1984 | United Kingdom . |
| 2137935 | 10/1984 | United Kingdom . |

OTHER PUBLICATIONS

Theodore et al, Journal of Coatings Technology, vol. 57, No. 721, pp. 67–71, (1985).
Stinson-C&EN (4/87), pp. 43–46.
P. M. Gomez–Polymer Preprints (Am. Chem. Soc. Div. Polym. Chem.), vol. 28, No. 1, pp. 209–210, 1987.

Primary Examiner—Veronica P. Hoke
Attorney, Agent, or Firm—JoAnn Villamizar; Luther A. R. Hall

[57] ABSTRACT

Light-stabilized polymer microparticles, which contain at least one light stabilizer and free epoxy groups, and processes for the preparation of these microparticles by polymerization of suitable monomers, at least one of these monomers being an epoxide which contains at least one further reactive group, and at least part of the polymerization being carried out in the presence of at least one light stabilizer, are described. The polymer microparticles can be used in coating compositions which comprise a disperse phase, containing these particles, and a liquid continuous phase.

Coatings and paints based on the compositions according to the invention are distinguished by improved weathering resistance, in particular high light stability.

23 Claims, No Drawings

LIGHT-STABILIZED POLYMER MICROPARTICLES CONTAINING EPOXY GROUPS

The invention relates to light-stabilized polymer microparticles containing epoxy groups, to processes for preparing these, to dispersions containing these and to coating compositions containing the latter.

Recently, due to the need to minimize pollution of the environment, there has been considerable interest, in coating technology, in increasing the proportion of the film-forming material present in the coating compositions and in reducing the proportion of inert liquid diluents which must be evaporated off during the preparation of the coating and during drying and curing.

Coating compositions with a high proportion of film-forming material have been disclosed, for example, in EP-A 3,166 and EP-A 119,051 and in the literature cited in each of these; they have in general the structure of a liquid continuous phase and a disperse phase which contains, if appropriate, a high proportion of insoluble polymer microparticles.

The resulting films and coatings have a composite character, namely a polymer matrix or a continuous phase derived from polymer which was originally in solution, and a disperse phase derived from the polymer microparticles.

Coating compositions containing known microparticles, however, have only inadequate light stability, since hitherto only the coating mixture as such has been stabilized by physical admixture of a light stabilizer to the homogeneous liquid phase.

By contrast, the sometimes high microparticle proportion of such coatings is unstabilized.

It has now been found that the light stability of coatings and paints, in particular baking paints, containing a proportion of microparticles can be improved if appropriate light stabilizers are incorporated into the microparticles and the latter are thus protected directly from weathering effects, in particular irradiation.

The invention therefore relates to light-stabilized polymer microparticles having a particle size distribution of 0.01–20 μm, obtainable by copolymerization of (a) one or more ethylenically unsaturated monomeric compounds or/and one or more different monomers selected from the group comprising polyalcohols, polycarboxylic acids, hydroxycarboxylic acids, lactones, aminocarboxylic acids, aminoalcohols and polyamines, and (b) at least one epoxide compound which contains at least one further reactive group, essentially only the latter taking part in the copolymerization, so that the resulting microparticles contain free epoxy groups, which microparticles contain 0.1–30% by weight, relative to the monomers employed, of one or more light stabilizers.

Preferably, at least part of the polymerization of the monomers is here carried out in the presence of the light stabilizers.

Microparticles are here to be understood as meaning polymer particles having a size or size distribution within the said colloidal dimensions, which particles are insoluble in the continuous liquid phase of coating compositions. The expression polymer microparticle is well known in coating technology and hence in the relevant literature. An essential feature of the microparticles, apart from their size, is that they contain a crosslinked core or consist of the latter. In the ideal form, the microparticles have an approximately spherical shape. In place of the term "microparticle", the term "microgel" is also usual in the literature. Therefore, the microparticles according to the invention can also be described as light-stabilized polymer microgels.

The microparticles according to the invention are formed by copolymerization of the two components (a) and (b), it being possible for component (a) to be a single monomer, but preferably consisting of several monomers, in order to obtain better crosslinking. Before the epoxide component (b) is added, which may if appropriate also be a mixture of several different epoxides, the monomers (a) can already have been pre-polymerized. However, such polymers must contain reactive groups in order to ensure copolymerization with the epoxide.

The polymerization must be controlled such that there are free epoxy groups in the finished microparticle. This is accomplished when the polymerization step with the epoxide essentially concerns only the additional reactive group, for example by polyaddition of an epoxide, containing an ethylenically unsaturated group, to an ethylenically unsaturated group of one or more monomers according to a) or polymerization products thereof which still contain ethylenically unsaturated groups.

If appropriate, the microparticles can be plasticized with a plasticizer.

Examples of suitable ethylenically unsaturated monomers according to component (a) are: ethene, propene, butene, isoprene, butadiene, acrylic acid and methacrylic acid and esters thereof, for example methyl methacrylate, butyl methacrylate, ethyl acrylate, butyl acrylate and 2-ethylhexyl acrylate, vinyl ethers, vinyl esters such as vinyl acetate and the vinyl esters of "Versatic Acid" ®, vinyl halides, for example vinyl chloride and vinylidene chloride, vinylaromatics such as styrene, vinyltoluene and tert-butylstyrene, or $\alpha,\beta$-unsaturated nitriles such as acrylonitrile or methacrylonitrile. Acrylate and methacrylate polymers and their copolymers are preferred.

The crosslinking of the microparticles based on such monomers can be improved by adding to the monomer mixture a certain quantity of monomers which, in addition to the unsaturated, polymerizable groupings, contain complementary reactive groups, for example glycidyl methacrylate or methacrylic acid. Suitable complementary reactive groups are described in British Patent Specification No. 1,156,012, where information on the monomers to be used and a process for the preparation of crosslinked addition polymer microparticles are also to be found. The microparticles prepared according to British Patent Specification No. 1,156,012 contain groups which have not co-reacted during the preparation but can be caused to undergo a co-reaction, for example by means of subsequent heating, and thus form crosslinks. In this connection, it must be made clear that, for example if glycidyl methacrylate is used as a crosslinking agent, this is not an epoxide within the meaning of component (b), since, if it is used, both the epoxy group and the double bond react (crosslinking) and no free epoxy group remains.

In another method for promoting crosslinking, a small proportion of monomers which are bifunctional with respect to the polymerization reaction, for example ethylene glycol dimethacrylate or divinylbenzene, are incorporated into the monomers subjected to the polymerization. Further examples of suitable bifunctional monomers are mentioned, for example, in U.S. Pat. No. 4,290,932.

It is a feature of the polymer microparticles according to the invention that, as a constituent of coating compositions, they can participate in the curing thereof via the free epoxy groups. If appropriate, the microparticles can also contain further free reactive groups, for example hydroxyl or carboxyl groups. These can originate from monomers of component (a), for example from hydroxyalkyl acrylates or methacrylates such as hydroxyethyl acrylate and hydroxyisopropyl methacrylate, or unsaturated carboxylic acids such as acrylic acid or methacrylic acid.

Examples of suitable monomers according to component (a), capable of condensation polymerization, are those which are generally known for the preparation of polymers by melt polymerization or solution polymerization techniques. Examples of suitable materials which give polyesters are polyhydric alcohols, for example ethylene glycol, propylene glycol, butylene glycol, 1,6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexanetriol, oligomers of styrene and allyl alcohol (for example the material marketed by Monsanto Chemical Co. under the name RJ 100) and the condensation products of trimethylolpropane with ethylene oxide or propylene oxide (for example the products known in the trade as "Niax" triols) together with polycarboxylic acids, for example succinic acid or its anhydride, adipic acid, azelaic acid, sebacic acid, maleic acid or its anhydride, fumaric acid, muconic acid, itaconic acid, phthalic acid or its anhydride, isophthalic acid, terephthalic acid, trimellitic anhydride, pyromellitic acid or its anhydride, truxinic acid and truxillic acid. In the case of polyamides, suitable monomeric starting materials are aminocarboxylic acids, for example 6-aminocaproic acid or 11-aminoundecylic acid or the corresponding lactams, and/or polyamines, for example ethylenediamine, propylenediamine, hexamethylenediamine, diethylenetriamine, triethylenetetramine or tris-(aminomethyl)-methane together with the abovementioned polycarboxylic acids.

Crosslinking in the polycondensation is accomplished, as already described for the addition polymer microparticles, for example by adding a proportion of one or more starting monomers, which have a functionality greater than 2, to the mixture which is to be polymerized.

The preferred monomers (a) are those from the group comprising polyalcohols, polycarboxylic acids, hydroxycarboxylic acids and lactones (in this case especially the monomers giving polyesters) and, in particular, ethylenically unsaturated monomeric compounds.

If additional reactive groups are required, suitable monomers which have a functionality greater than 2 and which, under the conditions of particle preparation, give maximum branching but cannot crosslink, are introduced into the monomer mixture.

The epoxide component (b) must, in addition to at least one epoxy group, contain at least one further reactive group. Such further reactive groups can, for example, be ethylenic double bonds or carboxyl, ester, nitrile, amide or hydroxyl groups. Carboxyl groups, ester groups and ethylenic double bonds, in particular the latter, are preferred.

Examples of particularly preferred epoxide compounds which can be used are:

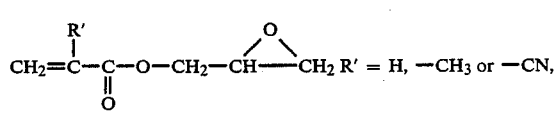

(1) $R' = H, -CH_3$ or $-CN$,

(2)

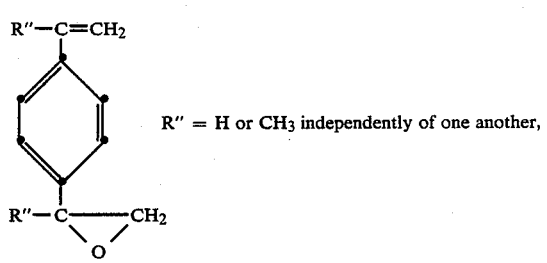

(3) $R'' = H$ or $CH_3$ independently of one another,

(4)

(5)

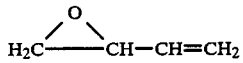

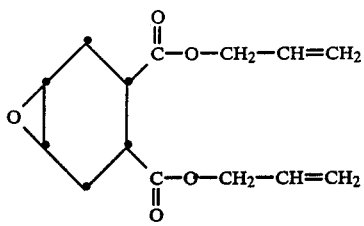

(6)

(7)

Compound (1) is here to be singled out especially.

The polymer microparticles according to the invention can, for example, consist solely of the crosslinked polymer core which then contains the light stabilizer. However, they then frequently do not form stable dispersions (the particles settle out) or the dispersion must be additionally stabilized by means of dispersants. Moreover, the distribution in the liquid continuous phase of the coating composition, in which the microparticles can be employed, is not ideal. It is therefore particularly preferred to modify the microparticles in such a way that stable dispersions in numerous dispersion media and good distribution in the liquid continuous phase of coating compositions are ensured. A preferred modification comprises attaching substantially linear or slightly branched polymer chains to the actual microparticle core, for example by polymerization or condensation onto the core (grafting). These linear polymers contain functional groups having such a ratio of hydrophilic and hydrophobic functions that the dispersibility of the resulting complete microparticle is enhanced and a stable dispersion is thus ensured. The linear or slightly branched polymers suitable for grafting onto the polymer microparticle core are also termed "amphipathic" dispersants below.

Of course, the dispersibility in certain solvents can also be ensured in other ways, for example by the introduction of suitable combinations of ionic groups. As will be explained later, the free epoxy groups can then be present in the core, in the amphipathic dispersant or in both parts.

Polymer microparticles according to the invention, which contain an amphipathic dispersant, can contain the light stabilizers in the core, in the amphipathic dispersant or in both. Different light stabilizers can then be present in the core and in the amphipathic dispersant in each case. The light stabilizer is incorporated into the amphipathic dispersant in the same way as into the core, namely by carrying out the preparation thereof (polymerization) in the presence of the light stabilizer.

In principle, the light stabilizers can be chemically anchored in the polymer microparticle (the light stabilizer participates in the polymerization) or only be physically occluded. Both cases give the desired light stabilization, but chemical incorporation is preferred.

Representatives of virtually all known classes of light stabilizers, for example sterically hindered amines, 2-(2-hydroxyphenyl)-benzotriazoles, oxalic acid anilides, 2-hydroxybenzophenones, hydroxyphenyltriazines or cinnamic acid derivatives, can be used for the light stabilization of the microparticles. The preferred light stabilizers here are 2-(2-hydroxyphenyl)-benzotriazoles and especially sterically hindered amines.

If the light stabilizer belongs to the class of sterically hindered amines, these are preferably cyclic amines, in particular derivatives of 5-membered, 6-membered or 7-membered heterocyclic ring systems with 1 or 2 N atoms, which have tertiary C atoms in both the ortho-positions to the N atom, thus effecting steric hindrance of the N atom.

Examples of such ring systems are 2,2,5,5-tetrasubstituted pyrrolidines, imidazolidones or oxazolines of the formulae

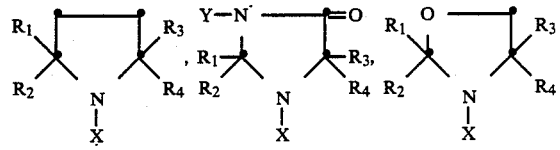

or 2,2,6,6-tetrasubstituted piperazinones and piperazinediones of the formulae

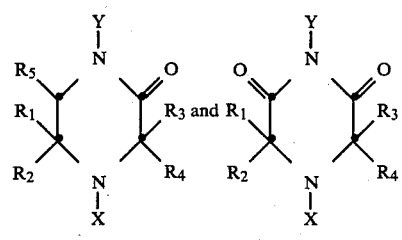

or diazacycloheptanones of the formula

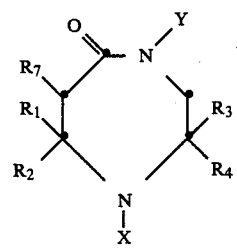

in which $R_1$, $R_2$, $R_3$ and $R_4$ are aliphatic hydrocarbon radicals which may be combined to form spiro rings, $R_5$ and $R_7$ are hydrogen or alkyl and X is hydrogen, oxyloxygen, OH or a monovalent organic radical and Y is hydrogen or a monovalent or divalent organic radical, for example of the formula

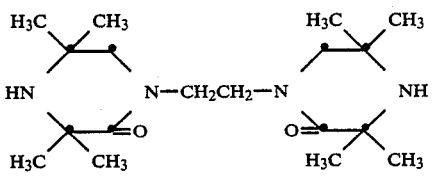

Decahydroquinolines disubstituted in the 2-position are also representatives of sterically hindered amines.

Amongst the sterically hindered amine compounds, 2,2,6,6-tetraalkylpiperidine derivatives are of particular importance. These are compounds which contain in their molecule at least one group of the formula I

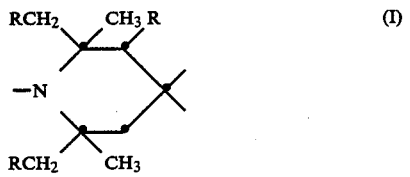

in which R is hydrogen or methyl. The light stabilizer can contain one or more such groups of the formula I, for example it can be a mono-, bis-, tris-, tetra- or oligo-piperidine compound. Those piperidine derivatives are preferred which contain one or more groups of the formula I, in which R is hydrogen, and those in which the ring nitrogen does not carry a hydrogen atom.

Most of these piperidine light stabilizers carry polar substituents in the 4-position of the piperidine ring or carry a spiro ring in this position.

The following classes of piperidine compounds are of particular importance.

(a) Compounds of the formula II

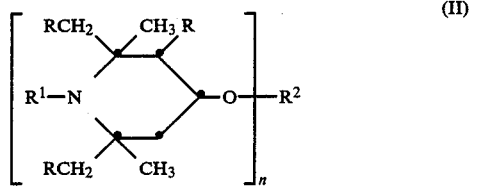

in which n is a number from 1 to 4, preferably 1 or 2, R is hydrogen or methyl, $R^1$ is hydrogen, oxyl, hydroxyl, $C_1$–$C_{18}$alkyl, $C_3$–$C_8$alkenyl, $C_3$–$C_8$-alkynyl, $C_1$–$C_{18}$alkoxy, $C_5$–$C_{12}$cycloalkoxy, $C_3$–$C_{18}$alkenyloxy, $C_7$–$C_{12}$aralkyl, $C_2$–$C_8$alkanoyl, $C_3$–$C_5$alkenoyl, glycidyl or a group —$CH_2CH(OH)$-Z, with Z being hydrogen, methyl or phenyl, $R^1$ preferably being $C_1$–$C_{12}$alkyl, allyl, benzyl, acetyl or acryloyl, and $R^2$, if n=1, is hydrogen, $C_1$–$C_{18}$-alkyl which may be interrupted by one or more oxygen atoms, cyanoethyl, benzyl, glycidyl, a monobasic radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 C atoms, a cycloaliphatic carboxylic acid having 7 to 15 C atoms, an α, β-unsaturated carboxylic acid having 3 to 5 C atoms or an aromatic carboxylic acid having 7 to 15 C atoms, or, if n=2, $R^2$ is $C_1$–$C_{12}$alkylene, $C_4$–$C_{12}$alkenylene, xylylene, a dibasic radical of an aliphatic, cycloaliphatic, araliphatic or aromatic dicarboxylic acid, dicarbamic acid or phosphorus-containing acid or a divalent silyl radical, preferably a radical of an aliphatic (saturated or unsaturated) dicarboxylic acid having 2 to 36 C atoms, a cycloaliphatic or aromatic dicarboxylic acid having 8–14 C atoms or an aliphatic, cycloaliphatic or aromatic dicarbamic acid having 8–14 C atoms, or, if n=3, $R^2$ is a tribasic radical of an aliphatic, cycloaliphatic or aromatic tricarboxylic acid, an aromatic tricarbamic acid or a phosphorus-containing acid or a trivalent silyl radical, or, if n=4, $R^2$ is a tetrabasic radical of an aliphatic, cycloaliphatic or aromatic tetracarboxylic acid.

Any $C_1$–$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

$C_1$–$C_{18}$Alkyl radicals $R^1$ or $R^2$ can be, for example, the groups listed above and in addition also, for example, n-tridecyl, n-tetradecyl, n-hexadecyl or n-octadecyl. Examples of $C_1$–$C_{18}$alkoxy are the alkoxy groups derived from the above alkyl groups.

A $C_3$–$C_8$alkenyl radical $R^1$ can be, for example, 1-propenyl, allyl, methallyl, 2-butenyl, 2-pentenyl, 2-hexenyl, 2-octenyl or 4-tert-butyl-2-butenyl.

A $C_3$–$C_8$alkynyl radical $R^1$ is preferably propargyl. Cycloalkyl(oxy) is preferably $C_5$–$C_7$cycloalkyl(oxy), especially cyclohexyl(oxy).

A $C_7$–$C_{12}$aralkyl radical $R_1$ is in particular phenethyl or especially benzyl.

A $C_1$–$C_8$alkanoyl radical $R^1$ is, for example, formyl, propionyl, butyryl, octanoyl or preferably acetyl, and $C_3$–$C_5$alkenoyl is especially acryloyl.

A monobasic radical $R^2$ of a carboxylic acid is, for example, an acetic acid, caproic acid, stearic acid, acrylic acid, methacrylic acid, benzoic acid or β-(3,5-di-tert-butyl-4-hydroxyphenyl)-propionic acid radical.

A dibasic radical $R^2$ of a dicarboxylic acid is, for example, a malonic acid, adipic acid, suberic acid, sebacic acid, maleic acid, phthalic acid, dibutylmalonic acid, dibenzylmalonic acid, butyl-(3,5-di-tert-butyl-4-hydroxybenzyl)-malonic acid or bicycloheptenedicarboxylic acid radical.

A tribasic radical $R^2$ of a tricarboxylic acid is, for example, a trimellitic acid or nitrilotriacetic acid radical.

A tetrabasic radical $R^2$ of a tetracarboxylic acid is, for example, the tetrabasic radical of butane-1,2,3,4-tetracarboxylic acid or pyromellitic acid.

A dibasic radical $R^2$ of a dicarbamic acid is, for example, a hexamethylenedicarbamic acid or 2,4-toluylenedicarbamic acid radical. Those compounds of the formula II should be especially mentioned in which n is 1 or 2, R is hydrogen, $R^1$ is hydrogen, oxyl, hydroxy, $C_1$–$C_6$alkyl, $C_1$–$C_{12}$alkoxy, cyclohexyloxy, $C_3$–$C_8$alkenyl, for example allyl, benzyl, $C_2$–$C_6$alkanoyl, $C_3$–$C_5$alkenoyl, for example acryloyl or methacryloyl, glycidyl or —$CH_2CH(OH)$-$Z_1$, with $Z_1$ being hydrogen or methyl, and $R^2$, if n=1, is hydrogen, $C_1$–$C_{12}$alkyl, benzyl or the radical of an aliphatic carboxylic acid having 2–18 C atoms, of an α, β-unsaturated carboxylic acid having 3–5 C atoms or of an aromatic carboxylic acid having 7–15 C atoms, and, if n=2, $R^2$ is $C_1$–$C_6$alkylene, $C_4$–$C_8$alkenylene or the radical of an aliphatic saturated or unsaturated dicarboxylic acid having 2–18 C atoms.

Those compounds of the formula II are particularly preferred in which $R^1$ or/and $R^2$ contain at least one ethylenic double bond, for example those in which $R^1$ is $C_3$–$C_8$alkenyl, $C_3$–$C_5$alkenoyl or $C_3$–$C_8$alkenyloxy, especially $C_3$–$C_5$alkenoyl, and $R^2$ is as defined and preferred above, and also, for example, those in which $R^2$ (for n=1) is a monobasic radical of an unsaturated carboxylic acid (for example having 3–5 C atoms, α, β-unsaturated) or (for n=2) is $C_4$–$C_{12}$alkenylene or the radical of an unsaturated dicarboxylic acid and $R^1$ is as defined and preferred above, and also those in which $R^1$ and $R^2$ each are such ethylenically unsaturated radicals.

Examples of tetraalkylpiperidine compounds from this class are the following compounds: (1) 4-hydroxy-2,2,6,6-tetramethylpiperidine, (2) 1-allyl-4-hydroxy-2,2,6,6-tetramethylpiperidine, (3) 1-benzyl-4-hydroxy2,2,6,6-tetramethylpiperidine, (4) 1-4-tert-butyl-2-butenyl)-4-hydroxy-2,2,6,6-tetramethylpiperidine, (5) 4-stearoyloxy-2,2,6,6-tetramethylpiperidine, (6) 1-ethyl-4-salicyloyloxy-2,2,6,6-tetramethylpiperidine, (7) 4-methacryloyloxy-1,2,2,6,6-pentamethylpiperidine, (8) 1,2,2,6,6-pentamethylpiperid-4-yl-B-(3,5-di-tert-butyl-4-hydroxyphenyl) propionate, (9) di-(1-benzyl-2,2,6,6-tetramethylpiperid-4-yl) maleate, (10) di-(2,2,6,6-tetramethylpiperid-4-yl) adipate, (11) di-(2,2,6,6-tetramethylpiperid-4-yl) sebacate, (12) di-(1,2,3,6-tetramethyl-2,6-diethyl-piperid-4-yl) sebacate, (13) di-(1-allyl-2,2,6,6-tetramethylpiperid-4-yl) phthalate, (14) 1-propargyl-4-β-cyanoethoxy-2,2,6,6-tetramethylpiperidine, (15) 1-acetyl2,2,6,6-tetramethylpiperidin-4-yl acetate, (16) tri-(2,2,6,6-tetramethylpiperid-4-yl) trimellitate, (17) 1-acryloyl-4-benzyloxy-2,2,6,6-tetramethylpiperidine, (18) di-(1,2,2,6,6-pentamethylpiperid-4-yl) dibutylmalonate, (19) di-(1,2,2,6,6-pentamethylpiperid-4-yl) butyl-(3,5-di-tertbutyl-4-hydroxybenzyl)-malonate, (20) di-(1,2,2,6,6-pentamethylpiperid-4- yl) dibenzylmalonate, (21) di-(1,2,3,6-tetramethyl-2,6-diethyl-piperid-4-yl) dibenzylmalonate, (22) hexane-1',6'-bis-(4-carbamoyloxy-1-n-butyl-2,2,6,6-tetramethylpiperidine), (23) toluene-2',4'-bis-(4-carbamoyloxy-1-n-propyl-2,2,6,6-tetramethylpiperidine), (24) dimethyl-bis-(2,2,6,6-tetramethylpiperid-4-oxy)-silane, (25) phenyl-tris-(2,2,6,6-tetramethylpiperid-4-oxy)-silane, (26) tris-(1-propyl-2,2,6,6-tetramethylpiperid-4-yl) phosphite, (27) tris-(1-propyl-2,2,6,6-tetramethylpiperid-4-yl ) phosphate, (28) bis-(1,2,2,6,6-pentamethylpiperid-4-yl) phenylphosphonate, (29) di(1,2,2,6,6-pentamethylpiperid-4-yl) sebacate, (29a) 4-hydroxy-1,2,2,6,6pentamethylpiperidine, (29b) 4-hydroxy-N-hydroxyethyl-2,2,6,6-tetramethylpiperidine, (29c) 4-hydroxy-N-(2-hydroxypropyl)-2,2,6,6-tetramethylpiperidine, (29d) 1-glycidyl-4-hydroxy-2,2,6,6-tetramethylpiperidine and (29e) 4-acryloyloxy-1,2,2,6,6-pentamethylpiperidine.

(b) Compounds of the formula (III)

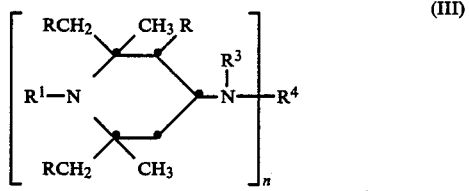

(III)

in which n is the number 1 or 2, R and $R^1$ are as defined and preferred under (a), $R^3$ is hydrogen, $C_1$–$C_{12}$alkyl, $C_2$–$C_5$hydroxyalkyl, $C_5$–$C_7$-cycloalkyl, $C_7$–$C_8$aralkyl, $C_2$–$C_{18}$alkanoyl, $C_3$–$C_{18}$alkenoyl or benzoyl and $R^4$, if n=1, is hydrogen, $C_1$–$C_{18}$alkyl, $C_3$–$C_8$alkenyl, $C_5$–$C_7$-cycloalkyl, $C_1$–$C_4$alkyl substituted by a hydroxyl, cyano, alkoxycarbonyl or carbamide group, glycidyl, a group of the formula —$CH_2$-CH(OH)-Z or of the formula —CONH-Z, with Z being hydrogen, methyl or phenyl, or, if n=2, $R^4$ is $C_2$–$C_{12}$alkylene, $C_6$–$C_{12}$arylene, xylylene, a —$CH_2$-CH(OH)-$CH_2$ group, or a —$CH_2$-CH(OH)-$CH_2$O-D-O-$CH_2$-CH(OH)-$CH_2$— group, with D being $C_2$–$C_{10}$alkylene, $C_6$–$C_{15}$arylene or $C_6$–$C_{12}$cycloalkylene, or, with the proviso that $R^3$ is not alkanoyl, alkenoyl or benzoyl, $R^4$ can also be a dibasic radical of a (saturated or unsaturated) aliphatic, cycloaliphatic or aromatic dicarboxylic acid or dicarbamic acid or also a —CO— group, or $R^3$ and $R^4$ together, if n=1, can be the dibasic radical of a (saturated or unsaturated) aliphatic, cycloaliphatic or aromatic 1,2- or 1,3-dicarboxylic acid.

Any $C_1$–$C_{12}$alkyl or $C_1$–$C_{18}$alkyl substituents are as already defined under (a).

Any $C_5$–$C_7$cycloalkyl substituents are especially cyclohexyl.

A $C_7$–$C_8$aralkyl radical $R^3$ is in particular phenylethyl or especially benzyl. A $C_2$–$C_5$hydroxyalkyl radical $R^3$ is especially 2-hydroxyethyl or 2-hydroxypropyl.

A $C_2$–$C_{18}$alkanoyl radical $R^3$ is, for example, propionyl, butyryl, octanoyl, dodecanoyl, hexadecanoyl or octadecanoyl, and preferably acetyl, and $C_3$–$C_5$alkenoyl is especially acryloyl.

A $C_2$–$C_8$alkenyl radical $R^4$ is, for example, allyl, methallyl, 2-butenyl, 2-pentenyl, 2-hexenyl or 2-octenyl.

A $C_1$–$C_4$alkyl radical $R^4$ which is substituted by a hydroxyl, cyano, alkoxycarbonyl or carbamide group can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)-ethyl.

Any $C_2$–$C_{12}$alkylene substituents are, for example, ethylene, propylene, 2,2-dimethylpropylene, tetramethylene, hexamethylene, octamethylene, decamethylene or dodecamethylene.

Any $C_6$–$C_{15}$arylene substituents are, for example, o-, m- or p-phenylene, , 1,4-naphthylene, 4,4'-diphenylene or

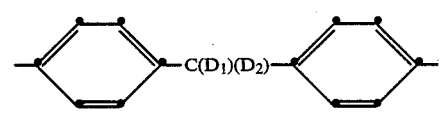

in which $D_1$ and $D_2$ independently of one another are hydrogen or methyl.

A $C_6$–$C_{12}$cycloalkylene radical D is especially cyclohexylene.

Those compounds of the formula III should especially be mentioned in which R and $R^1$ are as defined and preferred under (a), $R^3$ is hydrogen or $C_1$–$C_6$alkyl and $R^4$, if n=1, is hydrogen, $C_1$–$C_{12}$alkyl, $C_3$–$C_8$alkenyl, $C_1$–$C_4$alkyl which is substituted by hydroxy, cyano or carbamido, $CH_2$CH(OH)-Z or CONH-Z and, if n=2, $R^4$ is as defined under the formula III, with the exception of $R^3$+$R^4$ combined.

The preferences with regard to the substituents with ethylenic double bonds in compounds of the formula II apply analogously to compounds of the formula III. In this case, $R^3$ is preferably hydrogen or $C_1$–$C_{12}$alkyl and $R^4$ is as preferred for $R^2$ in the formula II.

Examples of tetraalkylpiperidine compounds from this class are the following compounds: (30) N,N'-bis-(2,2,6,6-tetramethylpiperid-4-yl)-hexamethylene-1,6-diamine, (31) N,N'-bis-(2,2,6,6-tetramethylpiperid-4-yl)- hexamethylene-1,6-diacetamide, (32) 1-acetyl-4-(N-cyclohexylacetamido)-2,2,6,6-tetramethylpiperidine, (33) 4-benzoylamino-2,2,6,6-tetramethyl piperidine, (34) N,N'-bis-(2,2,6,6-tetramethylpiperid-4-yl)-N,N'-dibutyladipamide, (35) N,N'-bis-(2,2,6,6-tetramethylpiperid-4-yl)-N,N'-dicyclohexyl-2-hydroxypropylene-1,3-diamine, (36) N,N'-bis-(2,2,6,6-tetramethylpiperid-4-yl)-p-xylylenediamine, (37) the compound of the formula

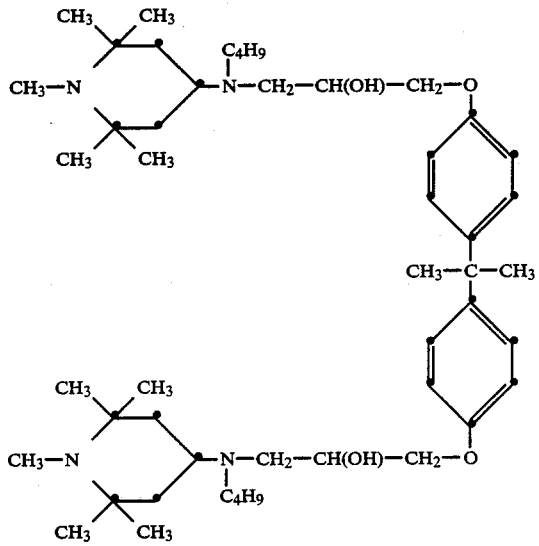

(38) 4-(bis-2-hydroxyethyl-amino)-1,2,2,6,6-pentamethylpiperidine, (39) 4-(3-methyl-4-hydroxy-5-tert-butyl-benzamido)-2,2,6,6-tetramethylpiperidine, (40) 4-methacrylamido-1,2,2,6,6-pentamethylpiperidine and (40a) 4-acrylamido-1,2,2,6,6-pentamethylpiperidine.

(c) Compounds of the formula (IV)

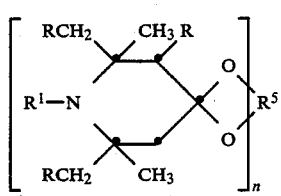

in which n is the number 1 or 2, R and $R^1$ are as defined and preferred under (a) and $R^5$, if n=1, is $C_2$-$C_8$alkylene or hydroxyalkylene or $C_4$-$C_{22}$acyloxyalkylene and, if n=2, is the group $(-CH_2)_2C(CH_2-)_2$.

A $C_2$-$C_8$alkylene or $C_2$-$C_8$hydroxyalkylene radical $R^5$ is, for example, ethylene, 1-methylethylene, propylene, 2-ethylpropylene or 2-ethyl-2-hydroxymethylpropylene.

The preferences for the substituent $R^1$ with ethylenic double bonds are here the same as in formula II.

A $C_4$-$C_{22}$acyloxyalkylene radical $R^5$ is, for example, 2-ethyl-2-acetoxymethylpropylene.

Thus, in the case of n=2, $R^5$ is the complement to form a spiro-6-ring and, in the case of n=1, preferably is the complement to form a spiro-5- or -6-ring.

Examples of tetraalkylpiperidine compounds from this class are the following compounds: (41) 9-aza-8,8,10,10-tetramethyl-1,5-dioxaspiro[5.5]undecane, (42) 9-aza-8,8,10,10-tetramethyl-3-ethyl-1,5-dioxaspiro[5.5]undecane, 43) 8-aza-2,7,7,8,9,9-hexamethyl-1,4-dioxaspiro[4.5]decane, (b 44) 9-aza-3-hydroxymethyl-3-ethyl-8,8,9,10,10-pentamethyl-1,5-dioxaspiro[5.5]undecane, (45) 9-aza-3-ethyl-3-acetoxymethyl-9-acetyl-8,8,10,10-tetramethyl-1,5-dioxaspiro[5.5]undecane and (46) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

(d) Compounds of the formulae VA, VB and VC

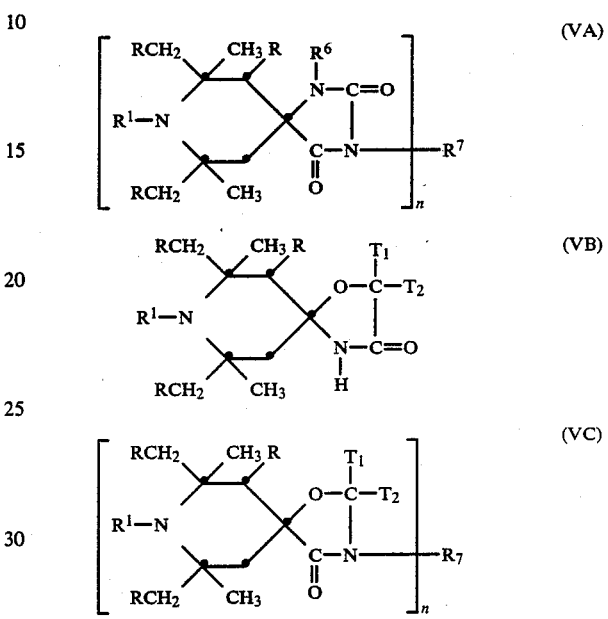

in which n is the number 1 or 2, R and $R^1$ are as defined and preferred under (a), $R^6$ is hydrogen, $C_1$-$C_{12}$alkyl, allyl, benzyl, glycidyl or $C_2$-$C_6$-alkoxyalkyl and $R^7$, if n=1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the formula $-(CH_2)_p$-COO-Q or of the formula $-(CH_2)_p$-O-CO-Q, with p being 1 or 2 and Q being $C_1$-$C_4$alkyl or phenyl, or, if n=2, $R^7$ is $C_2$-$C_{12}$alkylene, $C_4$-$C_{12}$alkenylene, $C_6$-$C_{12}$-arylene, a group $-CH_2$-CH(OH) -$CH_2$-O-D-O-$CH_2$-CH(OH)-$CH_2-$, with D being $C_2$-$C_{10}$ alkylene, $C_6$-$C_{15}$arylene or $C_6$-$C_{12}$cycloalkylene, or a group $-CH_2CH(OZ')CH_2$-$(OCH_2$-$CH(OZ')CH_2)_2-$, with Z' being hydrogen, $C_1$-$C_{18}$-alkyl, allyl, benzyl, $C_2$-$C_{12}$alkanoyl or benzoyl, and $T_1$ and $T_2$ independently of one another are hydrogen, $C_1$-$C_{18}$alkyl or are $C_6$-$C_{10}$-aryl or $C_7$-$C_9$aralkyl which are unsubstituted or substituted by halogen or $C_1$-$C_4$alkyl, or $T_1$ and $T_2$, together with the C atom linking them, form a $C_5$-$C_{12}$cycloalkane ring.

Any $C_1$-$C_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$-$C_{18}$alkyl substituents can, for example, be the groups listed above and additionally also, for example, n-tridecyl, n-tetradecyl, n-hexadecyl or n-octadecyl.

Any $C_2$-$C_6$alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

A $C_3$-$C_5$alkenyl radical $R^7$ is, for example, 1-propenyl, allyl, methallyl, 2-butenyl or 2-pentenyl.

$C_7$–$C_9$Aralkyl radicals $R^7$, $T_1$ and $T_2$ are in particular phenethyl or especially benzyl. $T_1$ and $T_2$ forming a cycloalkane ring together with the C atom can be, for example, a cyclopentane, cyclohexane, cyclooctane or cyclododecane ring.

spiro[5.1.11.2]heneicosan, (54) 2-butyl7,7,9,9-tetramethyl-1-oxa-4,8-diaza-3-oxo-spiro[4.5]decane and (54a) 8-acetyl-3-dodecyl-1,3,8-triaza-7,7,9,9-tetramethyl-spiro[4.5]decane-2,4-dione, or the compounds of the following formulae:

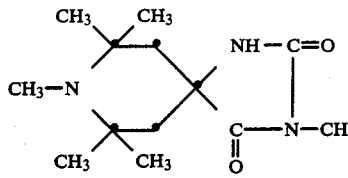 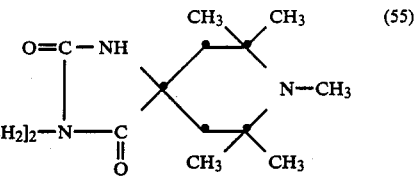 (55)

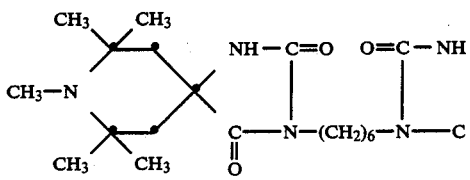  (56)

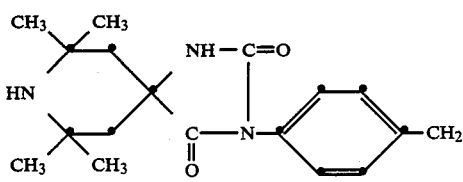 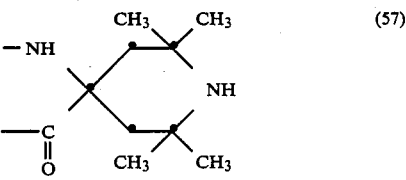 (57)

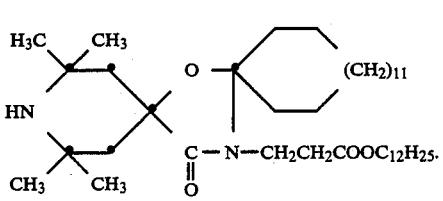 (58)

A $C_2$–$C_4$hydroxyalkyl radical $R^7$ is, for example, 2-hydroxyethyl, 2hydroxypropyl, 2-hydroxybutyl or 4-hydroxybutyl.

$C_6$–$C_{10}$Aryl radicals $R^7$, $T_1$ and $T_2$ are in particular phenyl, α- or β-naphthyl which are unsubstituted or substituted by halogen or $C_1$–$C_4$alkyl.

A $C_2$–$C_{12}$alkylene radical $R^7$ is, for example, ethylene, propylene, 2,2dimethylpropylene, tetramethylene, hexamethylene, octamethylene, decamethylene or dodecamethylene.

A $C_4$–$C_{12}$alkenylene radical $R^7$ is in particular 2-butenylene, 2-pentenylene or 3-hexenylene.

A $C_6$–$C_{12}$arylene radical $R^7$is, for example, o-, m- or p-phenylene, 1,4-naphthylene or 4,4'-diphenylene.

A $C_2$–$C_{12}$alkanoyl radical Z' is, for example, propionyl, butyryl, octanoyl or dodecanoyl, and preferably acetyl.

A $C_2$–$C_{10}$alkylene, $C_6$–$C_{15}$arylene or $C_6$–$C_{12}$cycloalkylene radical D is as defined and preferred under (b).

Examples of tetraalkylpiperidine compounds from this class are the following compounds: (47) 3-benzyl-1,3,8-triaza-7,7,9,9-tetramethylspiro[4.5]decane-2,4-dione, (48) 3-n-octyl-1,3,8-triaza-7,7,9,9-tetramethylspiro[4.5]decane-2,4-dione, (49) 3-allyl-1,3,8-triaza-1,7,7,9,9-pentamethylspiro[4.5]decane-2,4-dione, (50) 3-glycidyl-1,3,8-triaza-7,7,8,9,9pentamethylspiro[4.5]-decane-2,4-dione, (51) 2-isopropyl-7,7,9,9-tetramethyl-1-oxa-3,8-diaza-4-oxo-spiro[4.5]decane, (52) 2,2-dibutyl-7,7,9,9-tetramethyl-1-oxa-3,8-diaza-4-oxo-spiro[4.5]decane, (53) 2,2,4,4-tetramethyl-7-oxa-3,20-diaza-21-oxo-di- Those of the compounds of the formulae VA, VB and VC are again preferably used in which at least one of the general substituents contains an ethylenic double bond. $R^1$ is as defined and preferred for the formula II.

(e) Compounds of the formula VI

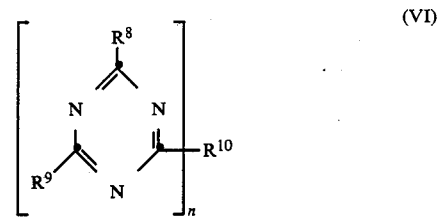 (VI)

in which n is the number 1 or 2 and $R^8$ is a group of the formula

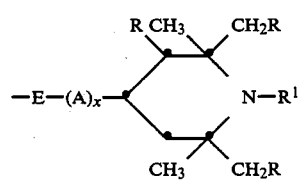

in which R and $R^1$ are as defined and preferred under (a), E is —O— or —$NR^{11}$—, A is $C_2$–$C_6$alkylene or —$(CH_2)_3$-O— and x is one of the numbers 0 or 1, $R^9$ is identical to $R^8$ or one of the groups —$NR^{11}R^{12}$, —OR$^{13}$, —NHCH$_2$OR$^{13}$ or —N(CH$_2$OR$^{13}$)$_2$, R$^{10}$ is, if n=1, identical to R$^8$ or R$^9$ and, if n=2, is a group —E-B-E—, wherein B is C$_2$-C$_6$alkylene which may be interrupted by —N(R$^{11}$)—, R$^{11}$ is C$_1$-C$_{12}$alkyl, cyclohexyl, benzyl or C$_1$-C$_4$hydroxyalkyl or a group of the formula

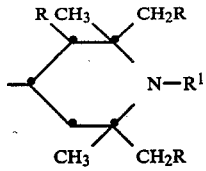

R$^{12}$ is C$_1$-C$_{12}$alkyl, cyclohexyl, benzyl or C$_1$-C$_4$hydroxyalkyl and R$^{13}$ is hydrogen, C$_1$-C$_{12}$alkyl or phenyl or R$^{11}$ and R$^{12}$ together are C$_4$-C$_5$alkylene or C$_4$-C$_5$oxaalkylene, for example

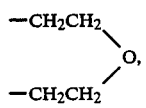

or a group of the formula

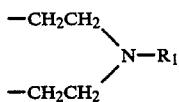

or R$^{11}$ and R$^{12}$ can also each be a group of the formula

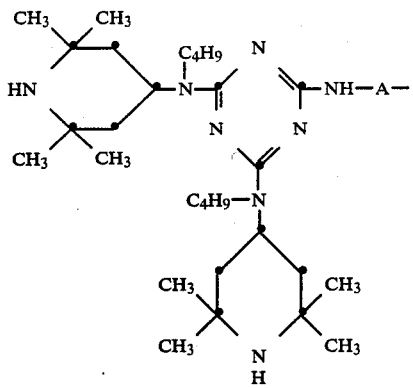

Any C$_1$-C$_{12}$alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any C$_1$-C$_4$hydroxyalkyl substituents are, for example, 2-hydroxyethyl, 2-hydroxypropyl, 3-hydroxypropyl, 2-hydroxybutyl or 4-hydroxybutyl.

A C$_2$-C$_6$alkylene radical A is, for example, ethylene, propylene, 2,2dimethylpropylene, tetramethylene or hexamethylene.

If R$^{11}$ and R$^{12}$ together are C$_4$-C$_5$alkylene or oxaalkylene, they are, for example, tetramethylene, pentamethylene or 3-oxapentamethylene.

Examples of tetraalkylpiperidine compounds from this class are the compounds of the following formulae:

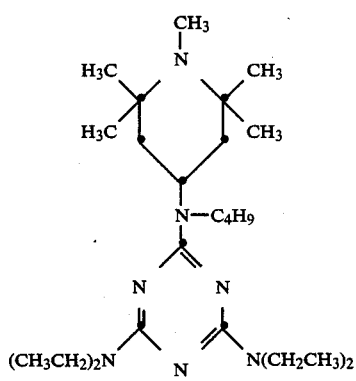

(59)

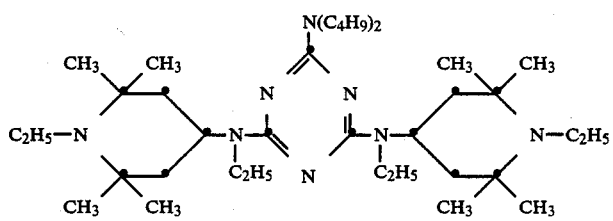

(60)

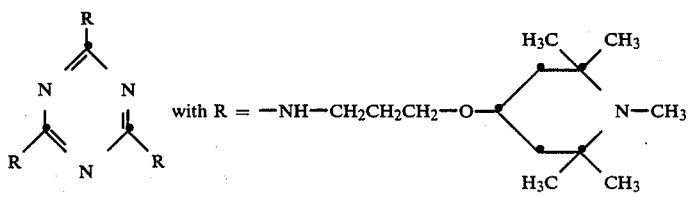

(61)

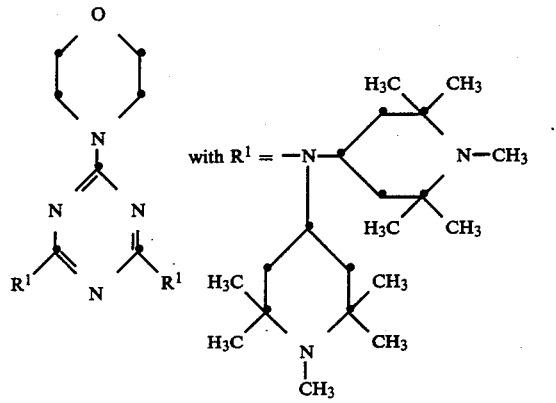
(61a)
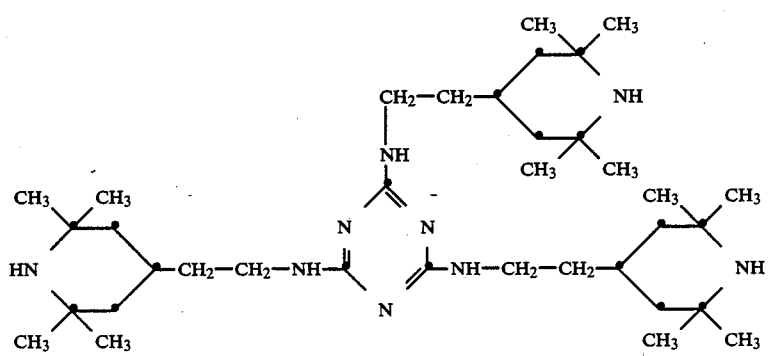
(62)
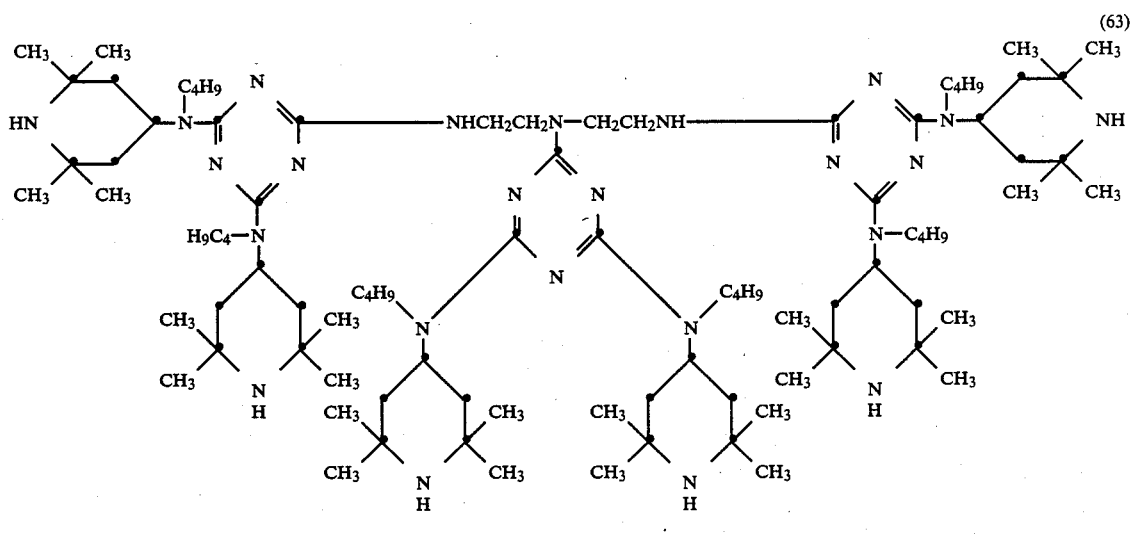
(63)

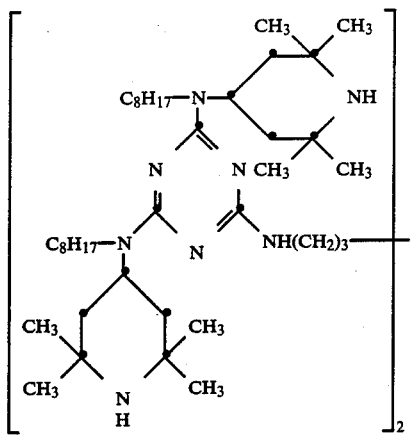
(64)

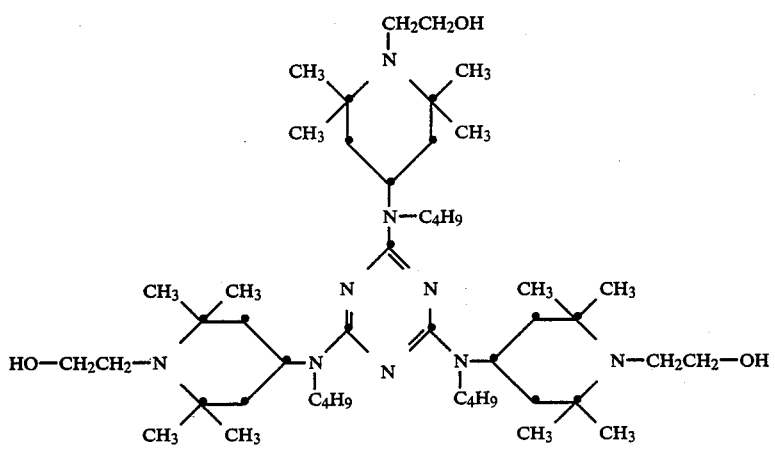
(65)

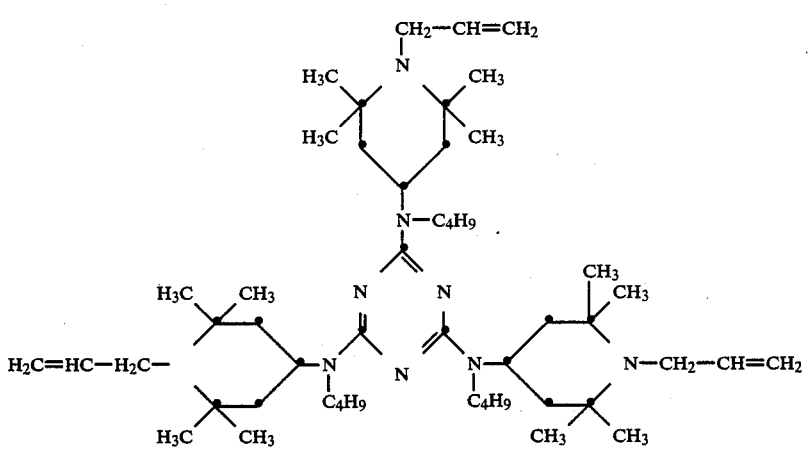
(66)

(f) Oligomeric or polymeric compounds, the recurrent structural unit of which contains a 2,2,6,6-tetraalkylpiperidine radical of the formula (I), in particular polyesters, polyethers, polyamides, polyamines, polyurethanes, polyureas, polyaminotriazines, poly(meth)acrylates, poly(meth)acrylamides and copolymers thereof, which contain such radicals.

Examples of 2,2,6,6-tetraalkylpiperidine light stabilizers from this class are the compounds of the following formulae, m being a number from 2 to 200.

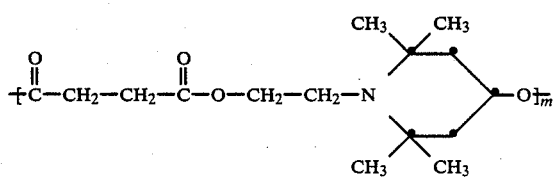
(76)

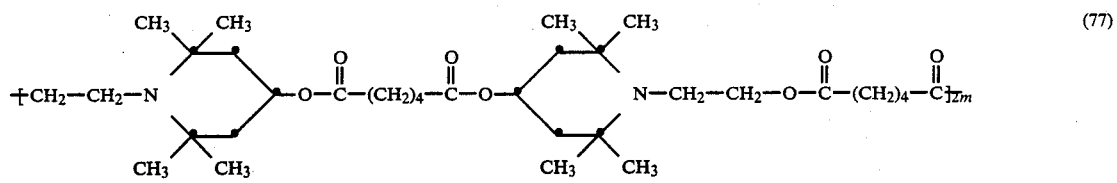
(77)
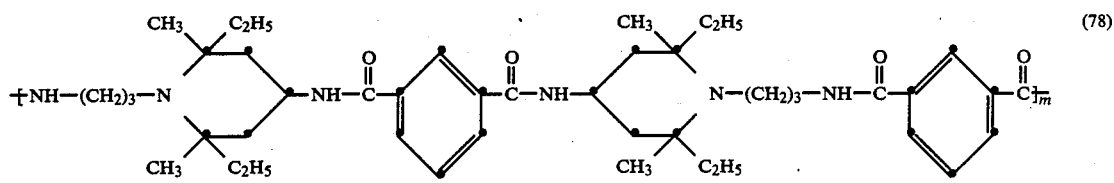
(78)
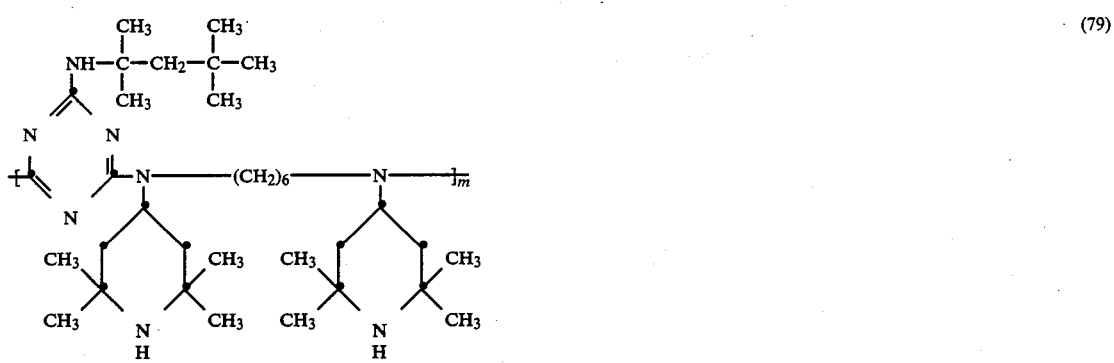
(79)
(80)
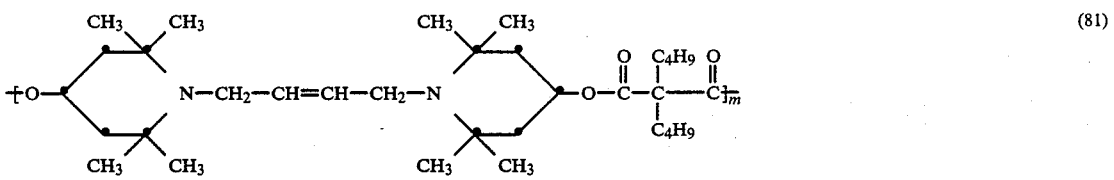
(81)
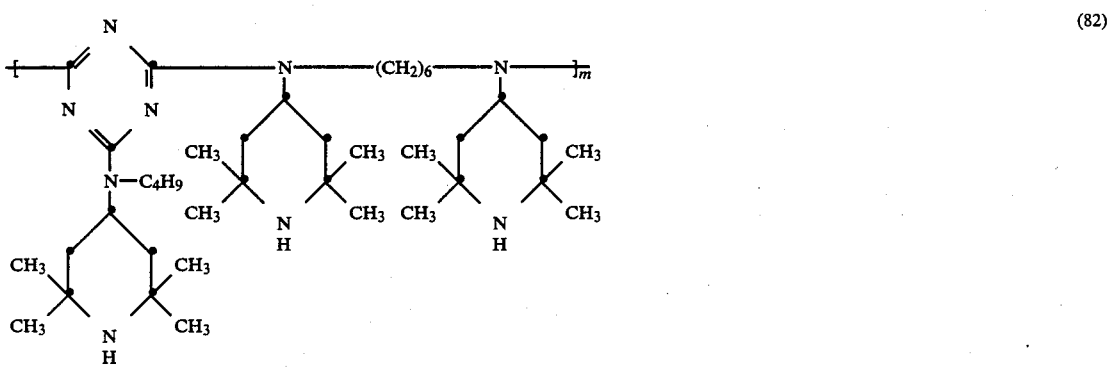
(82)

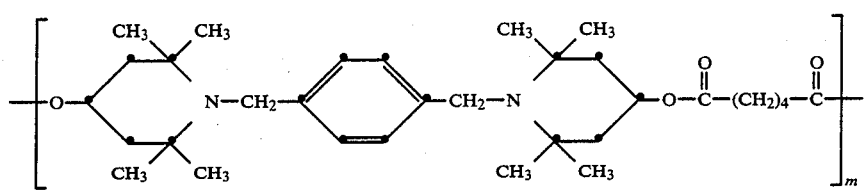 (83)
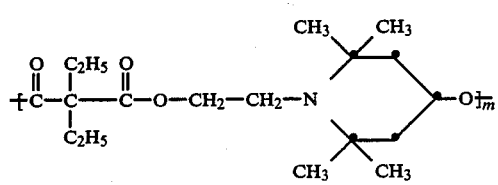 (84)
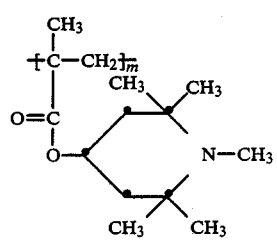 (85)
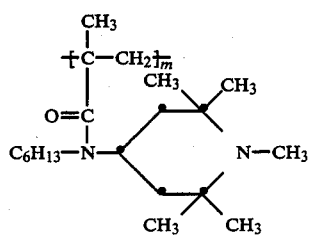 (86)
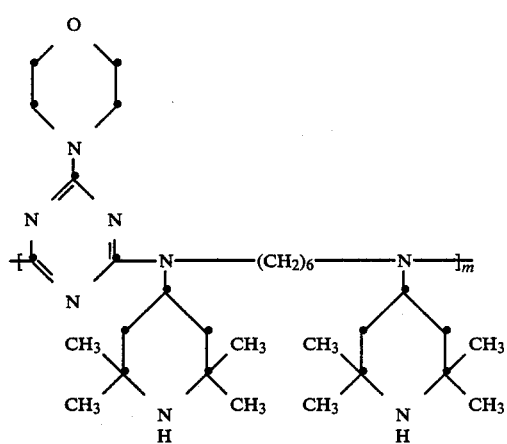 (87)
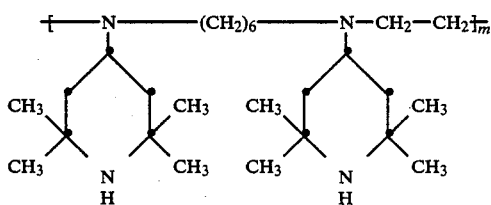 (88)

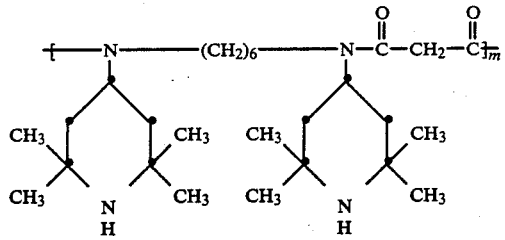

(89)

Sterically hindered amines which are particularly preferred with a view to the light stabilization of addition polymer microparticles are those which contain ethylenically unsaturated groups, for example allyl, vinyl or maleate groups, in particular acrylic or methacrylic groups, and which copolymerize with the other monomers. Therefore, those compounds of the formulae defined in the above sections (a) to (f) can preferably be used according to the invention which contain an ethylenic double bond in at least one of the substituents. This can be the case, for example, in the substituent $R^1$ and/or in the substituent in the 4-position in the piperidine ring. Examples of such compounds are compounds 2, 7, 9, 17, 29e and 49 listed above and also the following compounds: (90) 1-acetyl-2,2,6,6-tetramethyl-4-(meth)acryloyloxy-piperidine, (91) 1-benzyl-2,2,6,6-tetramethyl-4-(meth)acryloyloxy-piperidine, (92) 1,2,2,6,6-pentamethyl-4-(meth)acrylamido-piperidine, (93) 1,2,2,6,6-pentamethyl-4-(N-butyl)-acrylamidopiperidine, (94) 1,2,2,6,6-pentamethyl-4-maleimido-piperidine, (95) 1,3,8-triaza-2,4-dioxo-3-acryloyloxyethyl-7,7,8,9,9-pentamethylspiro[4.5]decane, (96) 1-[(2-methacryloyloxy)-ethyl]-2,2,6,6-tetramethyl-piperidine, (97) 1,2,2,6,6-pentamethyl-4-vinyloxy-piperidine, (98) 1,2,2,6,6-pentamethyl-4-methacryloyloxy-piperidine and (99) 1-acetyl-2,2,6,6-tetramethyl-4-maleimido-piperidine.

In special cases, it can be of advantage to use a mixture of sterically hindered amines.

The light stabilizers from the class of sterically hindered amines are known, for example, from EP-A 114,784 and can be prepared by known processes.

Another group of light stabilizers, which is also important besides the hindered amine type, are the UV absorbers which belong to various classes of compounds. UV absorbers are also suitable for stabilizing polymer microparticles, according to the invention. The first class of such UV absorbers is represented by the 2-(2-hydroxyphenyl)-benzotriazoles, of which the following structural types are particularly suitable for the polymer microparticles according to the invention:

(A) Compounds of the formula VII

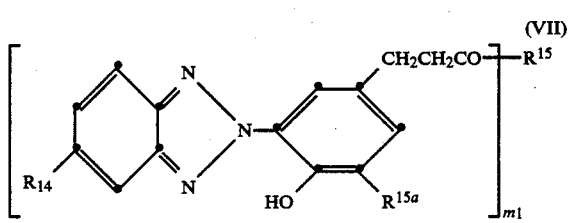

in which $R^{14}$ is H, Cl, $C_1$–$C_4$alkyl or $C_1$–$C_4$alkoxy (preferably H), $R^{15a}$ is hydrogen or $C_1$–$C_{12}$alkyl, especially $C_1C_6$alkyl and preferably t-butyl, and $m_1$ is one of the numbers 1 or 2, and in which $R^{15}$ (a) in the case of $m_1 = 1$, is

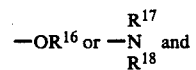

(b) in the case of $m_1 = 2$, is one of the divalent radicals

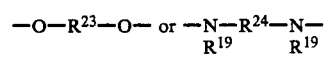

in which $R^{16}$ is H, $C_1$–$C_{18}$alkyl which is unsubstituted or substituted by 1 to 10 OH groups, unsubstituted or OH-substituted $C_5$–$C_{12}$cycloalkyl, unsubstituted or OH-substituted straight-chain or branched $C_2$–$C_{18}$alkenyl, $C_6$–$C_{14}$aryl, $C_7$–$C_{15}$alkaryl or $C_7$–$C_{15}$aralkyl which are unsubstituted or substituted by 1 or 2 OH groups,

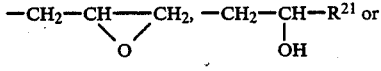

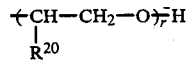

$R^{17}$ and $R^{18}$ independently of one another are H, straight-chain or branched $C_1$–$C_{18}$alkyl which is unsubstituted or substituted by one or more OH groups, straight-chain or branched $C_3$–$C_{18}$alkyl which is interrupted once or several times by —O— or —$NR^{19}$—, $C_5$–$C_{12}$cycloalkyl which is unsubstituted or substituted by one or more OH groups, $C_6$–$C_{14}$aryl, $C_7$–$C_{15}$alkaryl or $C_7$–$C_{15}$aralkyl which are unsubstituted or substituted by 1 or 2 OH groups, or straight-chain or branched $C_3$–$C_8$alkenyl, or $R^{17}$ and $R^{18}$ together with the N atom to which they are linked form a pyrrolidine, piperidine, piperazine or morpholine ring, $R^{19}$ is H or straight-chain or branched $C_1$–$C_{18}$alkyl which is unsubstituted or substituted by one or more OH groups, $R^{20}$ is H or methyl and r is an integer from 1 to 10, $R^{21}$ is H, straight-chain or branched $C_1$–$C_{18}$alkyl, unsubstituted or OH-substituted phenyl, $C_7$–$C_{15}$aralkyl or $C_7$–$C_{15}$alkaryl, —$SO_2C_1$–$C_4$alkyl —$SO_2$–$C_7$–$C_{18}$alkaryl, —$SO_2$–$C_6$–$C_{14}$aryl or —$CH_2$–O–$R^{22}$, $R^{22}$ is straight-chain or branched $C_1$–$C_{18}$alkyl or $C_3$–$C_{18}$alkenyl, $C_5$–$C_{12}$cycloalkyl, $C_6$–$C_{14}$aryl, $C_7$–$C_{15}$aralkyl or $C_7$–$C_{15}$alkaryl, $R^{23}$ is unsubstituted or OH-substituted $C_2$–$C_{12}$alkylene or $C_4$–$C_8$alkenylene, $C_4$-alkynylene, cyclohexylene, straight-chain or branched $C_4$–$C_{18}$alkylene which is interrupted once or several times by —O—,

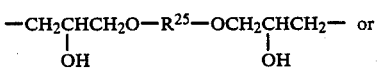

-continued

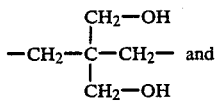

$R^{24}$ is straight-chain or branched $C_2$-$C_{12}$alkylene which may be interrupted once or several times by —O—, cyclohexylene,

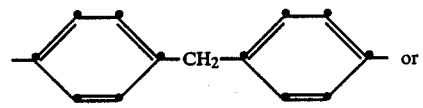

or $R^{24}$ and $R^{19}$ together with the two nitrogen atoms form a piperazine ring, $R^{25}$ being straight-chain or branched $C_2$-$C_8$alkylene, straight-chain or branched $C_4$-$C_{10}$ alkylene which is interrupted once or several times by —O—, 1,3- or 1,4-cyclohexylene, 1,3- or 1,4-phenylene,

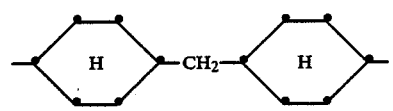

Those compounds of the formula VII should be singled out in which $R^{14}$ is —$OR^{16}$ or —O—$R^{23}$—O— and, amongst these, especially those in which $R^{16}$ is unsubstituted or OH-substituted alkyl or alkenyl, or $(CH_2CH_2O)_r$-H, and $R^{23}$ is unsubstituted or OH—substituted alkylene or alkenylene, or alkylene which is interrupted once or several times by 0, for example —$CH_2(CH_2OCH_2)_{r1}CH_2$— with $r_1 = 1$ to 9.

An alkyl radical $R^{14}$ can be, for example, methyl, ethyl, propyl, isopropyl, butyl and tert-butyl, and an alkoxy radical $R^{14}$ can be, for example, methoxy, ethoxy, propoxy and butoxy.

$R^{16}$, $R^{17}$, $R^{18}$, $R^{19}$, $R^{21}$ and $R^{22}$ can, for example, be the following alkyl radicals: methyl, isopropyl, n-butyl, sec-butyl, tert-butyl, tert-amyl, 2-ethylhexyl, n-octyl, 1,1,3,3-tetramethylbutyl, n-dodecyl, 1,1,7,7-tetramethyloctyl and n-octadecyl.

The radicals $R^{16}$, $R^{17}$, $R^{18}$ and $R^{19}$ are preferably substituted by one or more OH groups.

$R^{17}$ and $R^{18}$ can, for example, be the following $C_3$-$C_{18}$ alkyl radicals which are interrupted by —S—, —O— or —$NR^{19}$— or/and can be substituted by —OH methoxyethyl, ethoxyethyl, butoxyethyl, butoxypropyl, methylthioethyl, $CH_3OCH_2CH_2OCH_2CH_2$—, $CH_3CH_2OCH_2OCH_2OCH_2OCH_2$—, $C_4H_9OCH_2C$-$H_2OCH_2CH_2$—, dodecyloxypropyl, 2-hydroxyethyl, 2-hydroxypropyl, 4hydroxybutyl, 6-hydroxyhexyl, —$CH_2CH_2$—NH—$C_4H_9$, —$CH_2CH_2CH_2NH$—$C_8H_{17}$ and

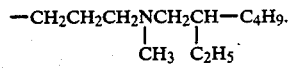

$R^{16}$, $R^{17}$, $R^{18}$ and $R^{22}$ can, for example, be the following $C_5$-$C_{12}$-cycloalkyl radicals: cyclopentyl, cyclohexyl, cyclooctyl or cyclododecyl. In the case of $R^{16}$, $R^{17}$ and $R^{18}$, the cycloalkyl radical can also be OH-substituted.

$R^{17}$ and $R^{18}$ can, for example, be the following alkenyl radicals: allyl, methallyl, 2-n-hexenyl and 4-noctenyl.

An alkenyl radical $R^{16}$ can be as defined for alkenyl radicals $R^{17}$ and $R^{18}$ or it can, for example, be —CH=$CH_2$, 10-n-undecenyl or 9-n-octadecenyl, and the radical $R^{16}$ can also be OH-substituted.

$R^{16}$, $R^{17}$, $R^{18}$, $R^{21}$ and $R^{22}$ independently of one another can, for example, be the following $C_7$-$C_{15}$aralkyl radicals: benzyl, α-phenylethyl,β-phenylethyl and 4-tert-butylbenzyl.

$R^{16}$, $R^{17}$, $R^{18}$ and $R^{22}$ independently of one another can, for example, be the following $C_6$-$C_{14}$aryl radicals: phenyl, α-naphthyl and β-naphthyl.

$C_7$-$C_{15}$Alkaryl radicals $R^{16}$, $R^{17}$, $R^{18}$, $R^{21}$ or $R^{22}$ can be a tolyl, xylyl, ethylphenyl, isopropylphenyl, n-butylphenyl, tert-butylphenyl, octylphenyl, di-tert-butylphenyl or nonylphenyl radical. The radicals can be substituted on the aromatic nucleus or preferably on the alkyl substituent by one or more OH groups.

Alkyl in an —$SO_2$-$C_1$-$C_4$alkyl radical $R^{21}$ can be a methyl, ethyl, n-propyl, isopropyl, n-butyl, sec-butyl or tert-butyl radical.

Aryl in an —$SO_2$-$C_6$-$C_{14}$aryl radical $R^{21}$ is, for example, phenyl, α- or β-naphthyl.

Alkaryl in an —$SO_2$-$C_7$-$C_{18}$alkaryl radical $R^{21}$ independently is as defined for $R^{16}$.

$C_2$-$C_8$Alkylene radicals $R^{23}$ and $R^{25}$ can, for example, be the following radicals: ethylene, propylene, butylene, hexylene and octylene.

An alkylene radical $R^{24}$ can independently be as defined for $R^{23}$ or, in addition, can also be higher-molecular groups such as decylene or dodecylene.

A $C_4$-$C_8$alkenylene radical $R^{23}$ can, for example, be the following group: butenylene.

Straight-chain or branched $C_4$-$C_{10}$alkylene groups interrupted by —O— in the case of $R^{23}$ and $R^{25}$ can, for example, be the following groups: —$CH_2CH_2OCH_2CH_2$—,

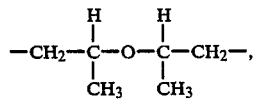

—$CH_2CH_2O$—$CH_2CH_2$—O—C $H_2CH_2$—, and —$CH_2CH_2O$—$CH_2CH_2O$—$Ch_2CH_2$—$OCH_2CH_2$—.

Typical representatives of compounds of the formula VII in which m is the number 1 are the following: 2-[2-hydroxy-5-(2-carboxyethyl)-phenyl]-benzotriazole, 2-[2-hydroxy-3-tert-butyl-5-(2-carboxyethyl)-phenyl]-benzotriazole, 2-[2-hydroxy-3-tert-butyl-5-(2-carboxyethyl)-phenyl]-5-chlorobenzotriazole, 2-[2-hydroxy-3-tert-butyl-5-(2-carbomethoxyethyl)-phenyl]-benzotriazole, 2-[2-hydroxy-3-tert-butyl-5-(2-carbomethoxyethyl)-phenyl]5-chlorobenzotriazole, 2-[2-hydroxy-3-tert-butyl-5-(2-carbocyclohexyloxyethyl)-phenyl]-benzotriazole, 2-[2-hydroxy-3-tert-butyl-5-(2-carbooctyloxyethyl)-phenyl]-benzotriazole, 2-{2-hydroxy-3-tert.-butyl-5-[2-carbo-(2-ethylhexyloxy)-ethyl]-phenyl}1-benzotriazole, 2-[2-hydroxy-3-tert-butyl-5-(2-carboisodecyloxyethyl)-phenyl]-benzotriazole, 2-[2-hydroxy-3-tert-butyl-5-(2-carbododecyloxyethyl)-phenyl]-benzotriazole, 2-[2-hydroxy-3-tert-butyl-5-(2-carbododecyloxyethyl)-phenyl]-5-chlorobenzotriazole, 2-[2-hydroxy-3-tert-butyl-5-(2-carbooctyloxyethyl)-phenyl]-5-chlorobenzotriazole, 2-{2-hydroxy-b 3-tert-butyl-5-[2-carbo-(2-ethyl]-phenyl}-5-chloro-benzotriazole, 2-{2-hydroxy-3-tert-butyl-5(2-hydroxycyclohexyloxy)-ethyl]-phenyl}-benzotriazole, 2-[2-hydroxy-3-tert-butyl5-(2-carbopiperidylamidoethyl)-phenyl]-benzotriazole, 2-[2-hydroxy-3-tert-butyl-5-(2-carbomorpholinoamidoethyl)-phenyl]benzotriazole and 2-{2-hydroxy-3-tert-butyl-5-[2-carbo-(3,5-di-tert-butyl-4-hydroxyanilido)-ethyl]-phenyl}-benzotriazole.

Typical representatives of compounds of the formula VII in which ml is the number 2 are the following:

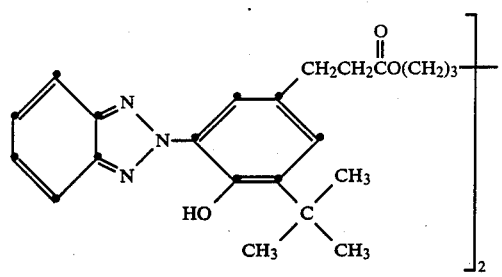

In certain cases, it can be of advantage to use a mixture of two or more compounds of the formula VII. An example is a mixture of 2-[2-hydroxy-3-tert-butyl-5-(2-carbo-n-octyloxyethyl-phenyl]-5-chlorobenzotriazole and 2-hydroxy-3-tert-butyl-5-[2-carbo-(2-ethylhexyl)-oxyethyl]-phenyl}-5-chlorobenzotriazole in a 1:1 weight ratio.

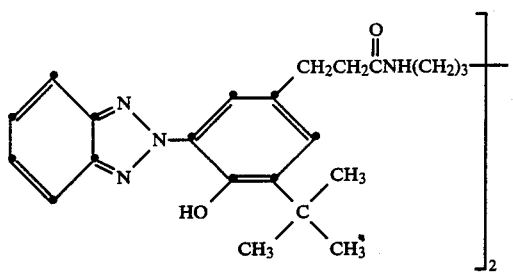

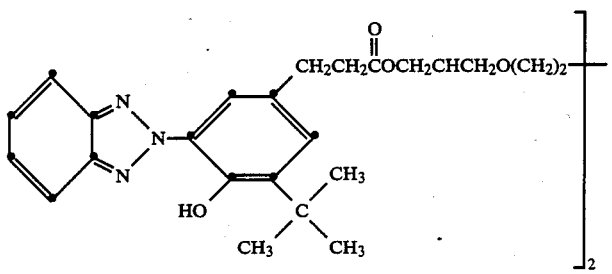

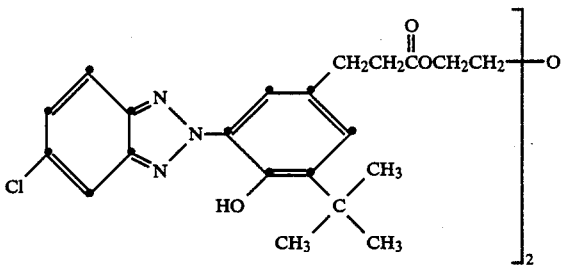

Further preferred compounds of the formula VII are: 2-[2-hydroxy-3-tert-butyl-5-(2-carbo-n-octyloxyethyl)-phenyl]-benzotriazole, 2-{2-hydroxy-3-tert-butyl-5-[2-carbo-(2-ethylhexyl)-oxyethyl]-phenyl}-benzotriazole, 2-[2-hydroxy-3tert-butyl-5(2-carbo-n-octyloxyethyl)-phenyl]-5-chlorobenzotriazole and 2-{2-hydroxy-3-tert-butyl-5-[2-carbo-(2-ethylhexyl)oxyethyl]-phenyl}-5-chlorobenzotriazole, and the compound of the formula B) Compounds of the formula VIII

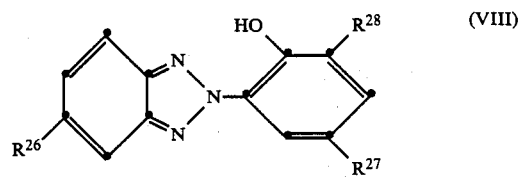

(VIII)

in which $R^{26}$ is H, chlorine or carboxyl, $R^{27}$ is straight-chain or branched, substituted or unsubstituted $C_1$–$C_{18}$alkyl, $C_7$–$C_{15}$aralkyl, $C_2$–$C_3$alkenyl or the group

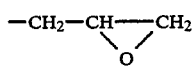

and $R^{28}$ is H or independently is as defined for $R^{27}$.

Substituted or unsubstituted $C_1C_{18}$alkyl radicals $R^{27}$ and $R^{28}$ can here independently of one another be as defined above for $R^{16}$. Other possible substituents are carboxyl groups. Preferably, the alkyl substituents are substituted by at least one hydroxyl or carboxyl group. $C_7$–$C_{15}$Aralkyl radicals $R^{27}$ and $R^{28}$ can independently of one another be, for example, benzyl, α-phenylethyl, β-phenylethyl, α,α-dimethylbenzyl or 4-tert-butylbenzyl.

Examples of suitable compounds of the formula VIII are

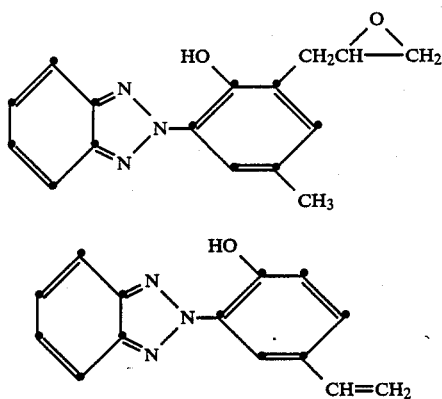

(C) Compounds of the formula IX

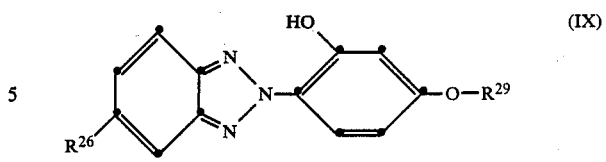

in which $R^{26}$ is as defined above and $R^{29}$ is straight-chain or branched $C_1$–$C_{18}$alkyl which is unsubstituted or substituted by one or more OH, carboxyl or epoxy groups and which may be interrupted once or several times by —O—,

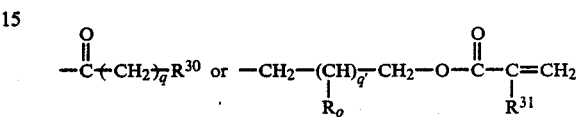

q is an integer from 1 to 12, $R^{30}$ is carboxyl or

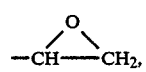

$R^{31}$ is hydrogen or methyl, $R_o$ is hydrogen or hydroxyl and q' is 0 or 1.

A substituted $C_1$–$C_{18}$alkyl radical $R^{29}$ is here preferably substituted by 1 to 3 OH, carboxyl or epoxy groups and particularly preferably by one OH, carboxyl or epoxy group.

A $C_1$–$C_{18}$alkyl radical $R^{29}$ interrupted by —O— can, for example, have the following structure

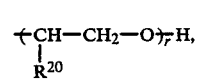

in which r and $R^{20}$ are as defined above.

Examples of suitable light stabilizers of the formula IX are:

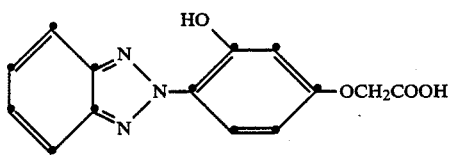

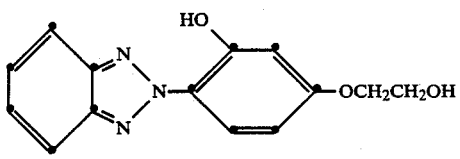

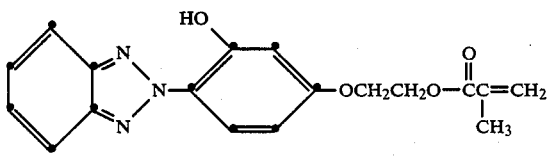

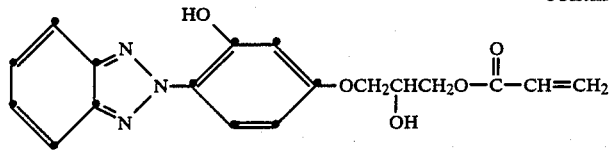

(D) Compounds of the formula X

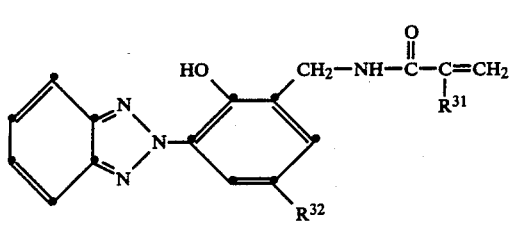
(X)

in which $R^{31}$ is as defined above and $R^{32}$ is hydrogen or straight-chain or branched $C_1$-$C_{18}$alkyl which is unsubstituted or is monosubstituted or polysubstituted by —OH.

A $C_1$-$C_{18}$alkyl radical $R^{32}$ can here be as defined above for $R^{16}$ and preferably is unsubstituted $C_1$-$C_{18}$alkyl. Examples of 2-(2-hydroxyphenyl)-benzotriazoles of this structural type are:

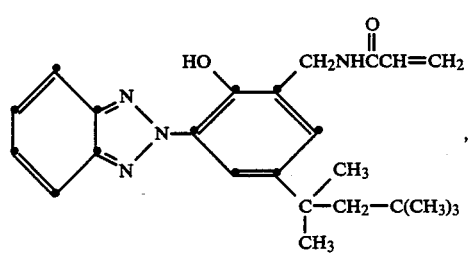

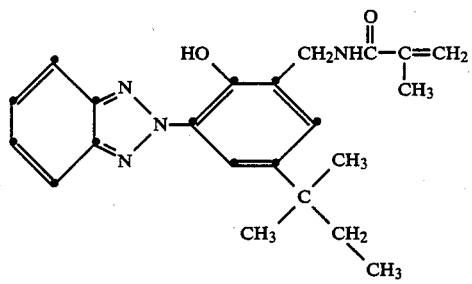

(E) Compounds of the formula IX

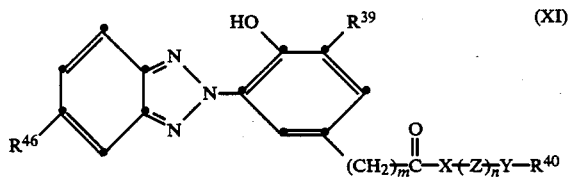
(XI)

in which X is —O— or —N($R^{41}$)—, Y is —O— or —N($R^{42}$)—, Z is $C_2$-$C_{12}$alkylene, $C_4$-$C_{12}$alkylene which is interrupted by one to three —N($R^{47}$)— group and/or oxygen atoms, $C_3$-$C_{12}$alkylene substituted by a hydroxyl group, butenylene, butynylene, cylkohexylene or phenylene, m is the number 0, 1 or 2, n is 1 or, is X and Y are —N($R^{41}$)— or —N($R^{42}$)— respectively, can also be 0, $R^{46}$ is hydrogen, chlorine, $C_1$-$C_4$alkyl or $C_1$-$C_4$alkoxy (preferably hydrogen), $R^{39}$ is hydrogen or $C_1$-$C_8$alkoyl and $R^{40}$ is a group —C(O)—C($R^{43}$)=C(H)$R^{44}$ or, if Y is —N($R^{42}$)—, forms together with $R^{42}$ a group —C(O)—CH=CH—C(O)—, $R^{43}$ being hydrogen or methyl, and $R^{44}$ is hydrogen, methyl or —C(O)—X—$R^{45}$, with $R^{45}$ being hydrogen, $C_1$-$C_{12}$ alkyl or a group of the formula

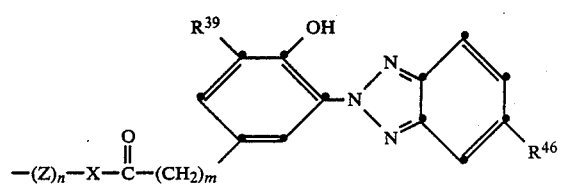

in which the symbols $R^{46}$, $R^{39}$, X, Z, m and n are as defined above, and $R^{41}$, $R^{42}$ and $R^{47}$ independently of one another are hydrogen, $C_1$-$C_{12}$alkyl, $C_3$-$C_{12}$alkyl interrupted by 1 to 3 oxygen atoms, cyclohexyl or $C_7$-$C_{11}$aralkyl, and, if Z is ethylene, $R^{41}$ can also form ethylene together with $R^{42}$.

Preferably, in the formula XI, $R^{46}$ is hydrogen or $C_1$, X is O or NH, especially O, m is 2, n is 1, Z is $C_2$-$C_6$alkylene, cyclohexylene or phenylene, Y is O or NH, especially O, and $R^{40}$ is —C(O)—C($R^{43}$)=C(H)$R^{44}$ with $R^{44}$=hydrogen or methyl.

Examples of benzotriazoles of the formula XI are: (2-acrylyloxy)-cyclohexyl 3-(2H-benzotriazol-2-yl)-4-hydroxy-5-tert-butyl-benzenepropanoate, (2-acrylyloxy)-cyclohexyl 3-(5-chloro-2H-benzotriazol-2yl)-4-hydroxy-5-tert-butylbenzenepropanoate, N-(2-acrylyloxyethyl)-3-(2H-benzotriazol-2-yl)-4-hydroxy-5-tert-butylbenzenepropanamide, N-(2-acrylyloxyethyl)-3-(5-chloro-2H-benzotriazol-2-yl)-4-hydroxy-5-tert-butyl-benzenepropanamide, N-(3-acrylyloxypropyl)-3-(2H-benzotriazol-2-yl)-4-hydroxy-5-tert-butylbenzene-propanamide, (2-acrylyloxy)-propyl 3-(2H-benzotriazol-2-yl)-4-hydroxy-5-tert-butyl-benzenepropanoate, (2-acrylyloxy)-butyl 3-(2H-benzotriazol-2-yl)-4-hydroxy-5-tert-butylbenzenepropanoate, (2-acrylyl-2-phenyl)-ethyl 3-(2H-benzotriazol-2-yl)-4-hydroxy-5-tert-butyl-benzenepropanoate, (2-acrylyl-3-phenoxy)-propyl 3-(2H-benzotriazol-2-yl)-4-hydroxy-5-tert-butyl-benzene-propanoate and N-(2-(4-methoxy-1,4-dioxo-cis-but-2-en-1-yloxy)-ethyl)-3-(2H-benzotriazol-2-yl)-4-hydroxy-5-tert-butyl-benzenepropanamide.

(F) Compounds of the formula XIa

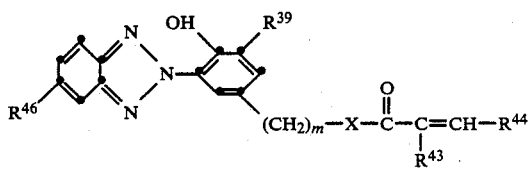

in which m, $R^{39}$, $R^{43}$, $R^{44}$ and $R^{46}$ are as defined under formula XI. The same preferences as those for formula XI apply to the formula XIa.

(G) Compounds of the formula XII

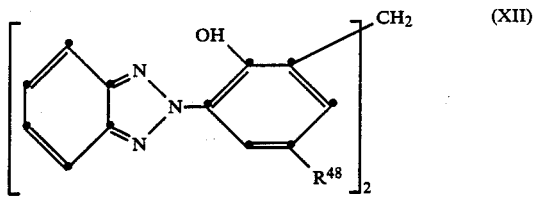

in which $R^{48}$ is substituted or unsubstituted $C_1$–$C_{18}$alkyl, $C_7$–$C_{15}$aryalkyl or $C_2$–$C_3$alkenyl.

A substituted or unsubstituted alkyl radical $R^{48}$ can here be, for example, as defined above for $R^{16}$. Further possible substituents are carboxyl groups. A substituted alkyl radical $R^{48}$ is then preferably substituted by 1 to 3 hydroxyl groups or/and 1 carboxyl group. However, the alkyl radical $R^{48}$ is preferably unsubstituted.

The 2-(2-hydroxyphenyl)-benzotriazoles which can be used as light stabilizers for the microparticles are known or can be prepared by methods known per se, for example according to EP-A 57,160, EP-A 133,165 and other documents, known to those skilled in the art, relating to 2-(2- hydroxyphenyl)-benzotriazoles. The light stabilizers (piperidine light stabilizers and UV absorbers) described in this application are also described in EP-A 226,538.

A further type of suitable light stabilizers from the UV absorber group is represented by 2-hydroxybenzophenones which have, for example, a structure according to the formula XIII

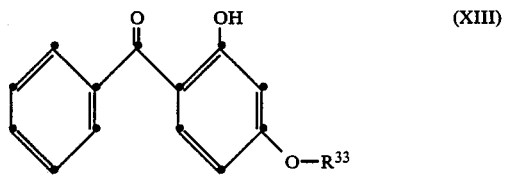

in which $R^{33}$ is hydrogen or straight-chain or branched $C_1$–$C_{18}$alkyl which may be interrupted once or several times by —O— and preferably is substituted by at least one hydroxyl, carboxyl or epoxy group, or is

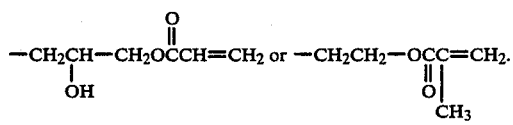

Examples of suitable 2-hydroxybenzophenones are the 4-hydroxy, 4-methoxy, 4-octyloxy, 4-decyloxy or 4-dodecyloxy derivatives, and these may be substituted by 1 to 3, preferably 1, hydroxyl, carboxyl or epoxy groups.

Further classes of suitable UV absorbers comprise 2,4-bis-(2'-hydroxyphenyl)-6-alkyl-s-triazines, for example the 6-ethyl, 6-heptadecyl or 6-undecyl derivatives, and oxalic acid diamides, in particular oxalic acid dianilides, for example 4,4'-di-octyloxy-oxanilide, 2,2'-dioctyloxy5,5'-di-tert-butyl-oxanilide, 2,2'-didodecyloxy-5,5'-di-tert-butyl-oxanilide, 2-ethoxy-2'-ethyl-oxanilide, N,N'-bis-(3-dimethylaminopropyl)oxalamide, 2-ethoxy-5-tert-butyl-2'-etyl-oxanilide and its mixture with 2-ethoxy-2'-ethyl-5,4'-di-tert-butyl-oxanilide and mixtures of o- and p- methoxy- and o- and p-ethoxy-di-substituted oxanilides.

Other possible light stabilizers for the microparticles are cinnamic acid derivatives of the formula XIV

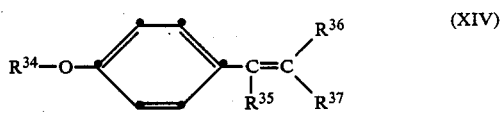

in which $R^{34}$ is hydrogen or straight-chain or branched $C_1$–$C_{18}$alkyl which may be interrupted by —O—, $R^{35}$ is hydrogen, $C_1$–$C_4$alkyl, methoxy or phenyl, $R^{36}$ and $R^{37}$ independently of one another are carboxyl, cyano or —C(O)O$R^{38}$ groups and $R^{38}$ is straight-chain or branched $C_1$–$C_{18}$alkyl which may be interrupted by —O—. Examples of suitable cinnamic acid derivatives are ethyl and isooctyl α-cyano-β,β-diphenylacrylate, methylα-carbomethoxycinnamate and methyl α-cyano-β-methoxycinnamate.

As already mentioned above, those light stabilizers are preferred which can be chemically anchored in, that is to say copolymerized into, the polymer microparticles according to the invention. Generally this is the case with light stabilizers, in particular those from the classes defined above, which contain reactive substituents which can participate in the polymerization reaction under the preparation conditions. Such substituents are especially those which contain ethylenic double bonds (especially when they are used in polymer microparticles which are to be prepared by polyaddition, for example acrylates) or carboxyl, hydroxyl and epoxy groups. The three last-mentioned groups are important especially when used for microparticles which are to be prepared by polycondensation (for example polyesters). Those light stabilizers can also be bonded chemically, at least partially, which contain groups from which reactive groups are formed under the polymerization conditions. Examples of these are ester groups, and composite substituents which contain ester groups.

In the case of the hindered amine light stabilizers, those are especially preferred which carry radicals containing hydroxyl groups or ethylenic double bonds. Amongst the UV absorbers, those are preferred which have groups containing hydroxyl, carboxyl or epoxy groups or ethylenic double bonds.

In general, 2,2,6,6-tetraalkylpiperidine derivatives (in particular those listed in the above sections (a) to (f)) and 2-(2-hydroxyphenyl)-benzotriazoles (in particular those listed in the above sections A) to G)) are preferably employed as light stabilizers. The compounds of the formulae II, III, IV, VA-VC and VI (especially those of the formulae II, III, Va and VI) and those of the formulae VII, IX, X, XI and XIa, in particular those of the formulae XIa and especially XI from amongst the UV absorbers, are here to be mentioned in particular.

The present invention also relates to a process for the preparation of light-stabilized polymer microparticles, having a particle size distribution of 0.01–20 m, which comprises (a) copolymerizing one or several different ethylenically monounsaturated or polyunsaturated monomeric compounds or/and one or several different monomers from the group comprising polyalcohols, polycarboxylic acids, hydroxycarboxylic acids, lactones, aminocarboxylic acids, aminoalcohols and polyamines with (b) at least one epoxide compound which contains at least one further reactive group, in the presence of 0.1 to 30% by weight, relative to the monomers, of one or more light stabilizers in such a way that substantially only the said further reactive group(s) of the epoxide compound participates in the polymerization, so that the resulting microparticles contain free epoxy groups, and that at least a part of the resulting polymer is crosslinked.

The polymerization can here take place in one or more steps, at least one step being carried out in the presence of the light stabilizers.

The monomers (a) used are with particular advantage acrylic acid and methacrylic acid and derivatives thereof, for example their esters, in particular the methyl or ethyl esters. Advantageously, monomer mixtures are employed (copolymers). In this way, for example, polyacrylate/epoxide microparticles are obtained. For the preparation of polyester/epoxide microparticles, the monomers used can advantageously be polyalcohols, polycarboxylic acids and hydroxycarboxylic acids. Mixtures of both types are also possible, if monomers are employed which have functionalities for both addition polymerization and condensation polymerization. Examples of the monomers to be used and also examples of the epoxide compounds of component (b) to be employed are listed above.

It is particularly advantageous to produce microparticles which contain parts conferring improved dispersibility on the particles. These parts can, for example, consist of an amphipathic dispersant which is an essentially linear to branched polymer which is polymerized onto the polymer microparticle core.

The process according to the invention is then carried out, for example, by ($a_1$) copolymerizing one or several different ethylenically monounsaturated or polyunsaturated monomeric compounds or/and one or several different monomers from the group comprising polyalcohols, polycarboxylic acids, hydroxycarboxylic acids and lactones with at least one epoxide compound, which contains at least one further reactive group, with crosslinking in such a way that substantially only the said further reactive groups of the epoxide compound participates in the polymerization, so that free epoxy groups remain, ($b_1$) polymerizing one or more of the monomers mentioned under ($a_1$) to give a substantially linear to branched polymer, which polymerization can also take place in the absence of the epoxide compound, and ($c_1$) polymerizing (grafting) the polymer obtained according to ($b_1$) onto the polymer obtained according to ($a_1$), the polymerization according to ($a_1$) or according to ($b_1$) or both polymerizations being carried out in the presence of one or more light stabilizers, it being possible for the light stabilizers in the two polymerization steps to be identical or different, and the total quantity of light stabilizer being 0.1 to 30% by weight, relative to the monomers in both polymerization steps, it being possible for the polymerization a1) to take place wholly or partially in the presence of the polymer formed according to ($b_1$).

The monomers which can be used in step ($b_1$) are in principle those which are also employed for step ($a_1$). However, they must be selected such that no crosslinking occurs during the polymerization. The linear to slightly branched polymers ("amphipathic dispersants") obtained according to step ($b_1$) are preferably copolymers which are grafted in the conventional manner onto the crosslinked polymers ("core") obtained according to (a). In step ($b_1$), the epoxide does not have to be copolymerized as a component, i.e. the copolymerized polymer chains ("amphipathic dispersant") do not need to contain epoxide groups. Microparticles with a particularly good light stabilization are obtained when the addition of the light stabilizer is made to the polymerization step ($b_1$) or to both step ($b_1$) and step ($a_1$).

A further advantageous embodiment comprises ($a_1$) polymerizing one or several different ethylenically monounsaturated or polyunsaturated monomeric compounds or/and one or more different monomers from the group comprising polyalcohols, polycarboxylic acids, hydroxycarboxylic acids and lactones with crosslinking, ($b_1$) copolymerizing one or more of the monomers indicated under ($a_1$) with at least one epoxide compound, which contains at least one further reactive group, to give a substantially linear to branched polymer in such a way that substantially only the said further reactive groups of the epoxide compound participates in the polymerization, so that free epoxy groups remain, and ($c_1$) polymerizing (grafting) the polymer obtained according to ($b_1$) onto the polymer obtained according to ($a_1$), the polymerization according to ($a_1$) or according to ($b_1$) or both polymerizations being carried out in the presence of one or more light stabilizers, and it being possible for the light stabilizers in the two polymerization steps to be identical or different and the total quantity of light stabilizer being 0.1 to 30% by weight, relative to the monomers, in both polymerization steps, and it being possible for the polymerization ($a_1$) to take place wholly or partially in the presence of the polymer formed according to ($b_1$). The comments made in the paragraph following the description of the first preferred embodiment of the process apply analogously. In this way, polymer microparticles are obtained which contain light stabilizer only in the "amphipathic dispersant" (in the polymer chains).

The polymerization itself can be carried out in a manner known per se, for example according to EP-A 3,166, EP-A 119,051, US-A 4,290,932, DE-A 2,818,102 or GB-A 1,156,012 and according to the literature references given in these.

Light-stabilized microparticles, which are formed substantially by addition polymerization, can be obtained, for example, according to EP-A 119,051 or US-A 4,290,932 by emulsion polymerization, by polymerizing a suitable selection of ethylenically unsaturated monomers (including ethylenically unsaturated epoxides) in water in the presence of a quantity, defined below, of one or more light stabilizers. Subsequently, the water can be removed, for example by azeotropic distillation.

The preparation of the microparticles according to the invention by a dispersion polymerization process, for example as disclosed in EP-A 3,166 or GB-A 1,156,012, is preferred.

In this case, for example, a selection of suitable monomers is polymerized in the presence of a quantity, defined below, of one or more light stabilizers in an organic solvent in which the light stabilizers and the monomers are soluble as far as possible, but the copolymer being formed is insoluble. It may happen that the light stabilizers used or the monomers, on which the condensation polymer microparticles are based, are only slightly soluble in the liquid in which the polymerization is to be carried out. In this case, the first stage of the dispersion polymerization comprises bringing the light stabilizer or the monomers concerned by means of a dispersant into the state of a colloidal dispersion in the inert liquid.

The preparation of the light-stabilized polymer microparticles according to EP-A 3,166 is particularly preferred, wherein the particle formation is preceded by the preparation of an amphipathic dispersant, which contains a component which is solvated by the organic liquid present and, in addition, contains a further component, by means of which it can be anchored to the polymer microparticles (step ($b_1$) above). Suitable monomers are then polymerized advantageously in the presence of an inert diluent and of the amphipathic dispersant prepared in situ, it being possible for the latter to be added before, during or after the polymerization according to step ($a_1$). If desired, the microparticles can then be separated from the resulting dispersion, for example by spray-drying or freeze-drying.

The anchorage of the amphipathic dispersant to the polymer microparticles can be of physical or chemical nature, chemical bonding of the dispersant to the microparticles being preferred.

Suitable amphipathic dispersants and their preparation are described, for example, in EP-A 3,166.

The light stabilizers is or are added to the monomer mixture, which is to be polymerized, in a quantity from 0.1 to 30% by weight and preferably 0.5 to 10.0% by weight, each relative to the monomers. The addition can be made at the start, together with the monomers, continuously during or towards the end of the polymerization/polycondensation process. In this way, uniform distribution of the light stabilizers in the microparticles or enrichment in the outer layers is achieved. This ensures that the light stabilizers is or are physically or chemically anchored in the resulting polymer microparticles depending on its nature. Preferably, the light stabilizer carries reactive groups, for example hydroxyl, carboxyl, ester, epoxy, amino or amide groups or ethylenic double bonds, for example in (meth)acrylate or vinyl groups, by means of which it can be chemically bonded to the polymer and, if appropriate, can participate directly in the polymerization.

The invention also relates to dispersions which contain the polymer microparticles according to the invention. For practical purposes, the microparticles are not isolated as such but processed further as a dispersion in the solvent in which the polymerization took place. The dispersants used can, in particular, be aromatic, aliphatic and cycloaliphatic hydrocarbons, but others, for example water, are also possible. Examples of hydrocarbons are benzene, toluene and especially higher-boiling aliphatic hydrocarbon fractions, for example those having a boiling range of 100°–200° C. The dispersions according to the invention contain the microparticles, for example in a quantity from 10 to 90%, in particular 20 to 80%, for example 40 to 80%, relative to the dispersion.

The invention also relates to a coating composition wherein the film-forming material comprises (a) 1 to 95% by volume of a disperse phase which contains microparticles according to the invention and (b) 99 to 5% by volume of a liquid continuous phase which has a viscosity of 0.1 to 30 poise at room temperature and is capable of curing together with the disperse phase to give a film-forming polymer, the total volume of (a) and (b) being 100% and the disperse phase participating in curing the coating. Phase (b) can here also contain one or more light stabilizers. The disperse phase contains preferably at least 15, for example 30 and preferably 50% by volume of microparticles.

Those coating compositions are preferred in which the film-forming material comprises 5 to 85, for example 15–85, % by volume of the disperse phase containing at least 50% by volume of microparticle according to the invention, and 95–15, for example 85–15, % by volume of the liquid continuous phase having a viscosity of 0.1 to 20 poise at room temperature.

Generally, the microparticles can here be added like an additive to a finished coating composition, or they can be employed in place of a corresponding proportion of the coating components, for example the acrylate or polyester component of a coating composition. Thus, the microparticles can also participate (as reactive component) in the curing of the coating.

The basic structure of such coating compositions is shown, for example, in EP-A 3,166, EP-A 119,051, US-A 4,290,932, DE-A 2,818,102 or GB-A 1,156,012. The particles of the disperse phase preferably have a size or size distribution in the range from 0.1 to 20 μm.

The disperse phase can consist exclusively of polymer microparticles; however, in addition to the microparticles and, if appropriate, solvent, the disperse phase preferably also contains particles of pigment, filler and/or extender, such as are conventionally used in coating compositions. With advantage, these particles have a size of, for example, 0.1 to 5 μm, as is conventional in coating technology.

The polymer microparticles and the pigment, filler and/or extender particles are advantageously in a stable dispersion in a deflocculated state in the liquid continuous phase; this can be accomplished, for example, by means of known pigment dispersants. Alternatively, the liquid film-forming material in the continuous phase or a chemical variant thereof can itself be an effective dispersant.

The dispersing of the pigment can be carried out in the manner customary in coating technology, for example with the use of ball mills, bead mills, attrition mills or colloid mills.

As already mentioned, it is preferred to prepare the light-stabilized microparticles according to the invention in accordance with EP-A 3,166 in an inert liquid and in the presence of an amphipathic dispersant, a stable dispersion of the polymer microparticles being formed. Pigment, filler and/or extender particles in this dispersion can likewise be stabilized by radicals of the amphipathic dispersant. The disperse phase obtained in this way can then be combined with the continuous phase to form a coating composition. For further details on this point, reference may be made to EP-A 3,166.

One advantage of the use of the microparticles according to the invention is that the disperse phase is capable of participating in the curing of the coating, since they contain free reactive epoxy groups. In addition, they can also contain further reactive groups, if appropriate monomers are employed for the polymerization. If desired, the dispersant part can also contain reactive groups, for example hydroxyl or carboxyl groups, which can be located in the solvated polymer part or in that part of the molecule which serves as an anchoring component for the microparticles.

As a result of the conditions described in the preceding paragraph, the disperse phase/continuous phase system forms a two-component system, i.e. the film formation is accomplished at least partially by a reaction of the two phases with one another.

An example of a corresponding amphipathic dispersant is a graft copolymer which is obtainable by copolymerization of methyl methacrylate, methacrylic acid and the glycidyl methacrylate adduct of the copolyester from 12-hydroxystearic acid and dimethylolpropionic acid. Further examples of suitable dispersants are given in EP-A 3,166.

Component (b) of the coating compositions according to the invention is the liquid continuous phase which is capable of giving a polymer film when cured by means of addition or condensation polymerization.

Condensation polymerization is here to be understood as meaning, in particular, the polymerization by means of a reaction of pairs of functional groups with the formation of functional units which are not present in the monomers, in which case the reaction can, if appropriate, be connected with the evolution of low-molecular by-products (see EP-A 3,166).

Suitable constituents of the continuous phase are in particular curable or thermosetting resins which can be converted into a film-forming polymer by means of heating and/or addition of a catalyst. Examples of such resins are:

1. Phenol/formaldehyde resins, i.e. the product of the reaction of phenols with formaldehyde.
2. Amino/formaldehyde resins, for example urea/formaldehyde or melamine/ formaldehyde resins, obtainable by reacting urea, melamine or other nitrogen-containing compounds with formaldehyde.
3. Crosslinkable acrylic resins which are derived from substituted acrylates, for example epoxy-acrylates, urethane-acrylates or polyesteracrylates, and also acrylic resins which do not contain any olefinic double bond and the OH or/and COOH groups of which can participate in the condensation reaction.
4. Polyester resins and alkyd resins.
5. Polyurethane resins based on the reaction of diisocyanates or polyisocyanates with polyhydroxy compounds.
6. Epoxide resins, for example those obtained by reacting epichlorohydrin with bisphenol A.

The continuous phase can, in principle, consist of a single liquid substance or of a homogeneous liquid mixture of two or more substances.

A mixture of two or more substances is preferred, and this can be in the form of a one-component or two-component system.

If the continuous liquid phase is a one-component system, this contains the film-forming constituents in a storage-stable form, and curing can take place, for example, by mere heating, or a curing agent is added.

Suitable one-component systems are built up, for example, from one of the said thermosetting resins and, if appropriate, a further liquid substance, the so-called reactive diluent, which contains reactive groups, by means of which it can participate in the curing of the film-forming material and which especially contributes to improved flexibility of the coat film. The reactive diluent is, for example, a bifunctional monomer or oligomer having molecular weights up to about 1,000 and containing, in particular, OH groups, for example 2-6 OH groups. Examples of these are simple glycols or polyols such as butane-1,4-diol, and especially hydroxy-terminated oligomeric esters of polyalcohols with polycarboxylic acids and/or monocarboxylic acids. Examples of suitable reactive diluents are given in EP-A 3,166.

If the continuous liquid phase is a two-component system, this is prepared only just before application of the finished coating composition, by combining two liquid components which are mutually reactive and, in addition, are capable of forming a film.

In this case, the second component can co-react with the first component and thus form a cured film, as is the case, for example, with two-component polyurethane coatings. However, the second component can also be a catalyst for the curing reaction of the first component, the acid-catalyzed curing of amino resins being an example.

Those coating compositions are preferred according to the invention which are based on a crosslinkable acrylate, polyester/alkyd or polyurethane resin which, if appropriate, has been crosslinked with aminoplasts or polyisocyanate.

The coating compositions according to the invention can, in the continuous phase, contain a catalyst for curing the coating, which catalyst is added, depending on the nature of the film-forming material used, preferably in a quantity from 0.1 to 15% by weight, relative to the total continuous phase including any reactive diluent present.

If the continuous phase consists mainly of thermosetting resins, the catalyst is preferably an acidic catalyst or a catalyst which releases acid on heating, for example methanesulfonic acid, toluenesulfonic acid, phosphoric acid, half-esters of maleic acid, cyclohexylphosphonous acid, trichloroacetic acid, trifluoroacetic acid or a tetrahalogenophthalic acid and half-esters thereof.

In addition to the film-forming components, namely the disperse phase and the liquid continuous phase, the coating compositions according to the invention can contain an inert liquid diluent, for example in a quantity of up to 50 and in particular 30% by volume which volatilizes under the conditions of the application of the coating composition to a substrate.

Examples of suitable inert solvents are aromatic and aliphatic hydrocarbons, halogenated hydrocarbons and carboxylate esters.

It can be desirable to add further substances to the coating composition, which affect certain properties, for example the flow behaviour or the adhesion to a substrate. Such additives, which are in general added to the continuous phase, are known to those skilled in the art.

Preferably, the film-forming material in the coating compositions according to the invention consists of 10 to 80, for example 20–80, % by volume of disperse phase and 90 to 20, for example 80–20, % by volume of liquid continuous phase.

The coating compositions according to the invention can be applied to a substrate by means of any conventional method known to those skilled in the art, for example by brushing, spraying, dipping or electrophoretic application. The coatings and finishes based on the compositions according to the invention are dried after application and baked.

The coating compositions according to the invention are suitable for use in any types of industrial painting, for example for painting machines, vehicles, ships or structural components. They are of particular importance for vehicle painting. This may be either one-coat or multi-coat painting.

Coatings and finishes based on the coating composition according to the invention are distinguished by improved weathering resistance, and especially by a very high light stability.

Moreover, the invention relates to the use of light-stabilized microparticles according to the invention as constituents of coating compositions.

In the dispersion which is obtained in the process according to the invention and which contains the polymer microparticles according to the invention, there are also, in addition to the actual microparticles which meet the required specifications (size distribution 0.01–20 μm and crosslinking), proportions of other polymers which are not microparticles in the above sense. These do not interfere with the use in coating compositions, so that the dispersions obtained can as a rule be employed directly. If required, however, the microparticles can also be isolated as such or purified by removal of other polymer fractions present. The latter can be accomplished, for example, by reprecipitation in suitable solvents, in which the uncrosslinked fractions are soluble. This gives purified microparticle dispersions, from which the particles themselves can be isolated by suitable methods known per se, for example by spray-drying and especially by freeze-drying. The isolated microparticles can then likewise be characterized by methods conventional in polymer chemistry, for example by means of light-scattering measurements, scanning electron microscopy, determination of the size distribution, of the form, and the like. As already mentioned above, the microparticles have, in the ideal case, a spherical to oval shape. The isolation and characterization of polymer microparticles have been described in many literature references, for example by Funke et al., Progr. Colloid Polymer Sci. 57, 48–53 (1975).

The examples which follow are intended for a further illustration of the various aspects of the present invention, but do not represent any restriction whatsoever of the generally applicable principle of the present invention. In the examples, like everywhere else in the remainder of the description, parts and percentages are by weight, unless otherwise stated. In Preparation Examples 1 to 8, the isolation of the microparticles as such is not mentioned, for the sake of simplicity. This can be carried out in the manner explicitly described above.

EXAMPLE 1

A. Preparation of an amphipathic dispersant

I. Preparation of a 12-hydroxystearic acid/dimethylolpropionic acid copolyester 1,350 g of 12-hydroxystearic acid and 100.5 g of 2,2-bis-(hydroxymethyl)propionic acid as well as 145 g of an alkane mixture (boiling range 180°–220° C.) and 3 g of methanesulfonic acid as a catalyst are put into a 2.5 litre sulfonation flask fitted with a stirrer, water separator and nitrogen inlet. The reaction mixture is then heated to 156° C., about 78 g of $H_2O$ being separated out in the course of 6 hours (solution $A_1$).

II. Preparation of a glycidyl methacrylate adduct of I 500 g of the solution A1 thus obtained are heated for six hours under reflux with 46.5 g of glycidyl methacrylate, 1.5 g of dimethylaminododecane, 0.5 g of hydroquinone and 20 g of alkane mixture (boiling range 180°–200°) in a 1.5 litre sulfonation flask fitted with N2 inlet and reflux condenser (solution $B_1$).

III. Copolymerization 375 g of methyl ethyl ketone are put into a 1.5 litre sulfonation flask with a reflux condenser and $N_2$ inlet and heated to reflux (80° C.). In the course of 2 hours, the following mixture is added dropwise:
- 213.5 g of solution $B_1$ (obtained according to II)
- 184 g of methyl methacrylate
- 20.5 g of methacrylic acid
- 2.15 g of azodiisobutyronitrile and
- 2.15 g of n-octylmercaptan.

After the dropwise addition of the solution has been completed, a further 0.3g of azodiisobutyronitrile is added and the solution is boiled under reflux for a further 2 hours. The solution is then diluted with 580 g of ®Solvesso 100 (alkane mixture: boiling range 162°–177° C.) and about 40 g of solvent mixture are distilled off. This gives a solution of about 30% solids content (=solution $C_1$).

B. Preparation of a light-stabilized polymethacrylate microparticle dispersion with free epoxy groups in the microparticles 284 ml of ®Solvesso 100 (alkane mixture, d =0.85, boiling point 162°–177° C.) and 464 ml of xylene are put into a 1.5 litre sulfonation flask fitted with a thermometer, stirrer, reflux condenser, nitrogen blanketing connection and dropping funnel. The mixture is heated under nitrogen to about 94° C. A mixture consisting of
- 19.4 g of methyl methacrylate,
- 0.4 g of methacrylic acid,
- 7.2 g of solution $C_1$ and
- 1.6 g of azodiisobutyronitrile is added all at once and the mixture is stirred for 30 minutes under reflux (1st polymerization stage). The following mixture is added dropwise in the course of 3 hours to this clear solution while still under reflux:
- 330.4 g of methyl methacrylate,
- 3.8 g of methacrylic acid,
- 56.9 g of glycidyl methacrylate,
- 5.0 g of azodiisobutyronitrile,
- 0.8 g of dimethylaminoethanol,
- 67.6 g of solution $C_1$ and
- 9.0 g of 4-acryloyloxy-1,2,2,6,6-pentamethylpiperidine (2nd polymerization stage). The viscosity of the reaction mixture increases with the progress of the reaction. After the dropwise addition, the mixture is stirred for a further 10 minutes at 95° C. and cooled to room temperature. This gives a homogeneous, highly viscous polymethacrylate microparticle dispersion of about 40% solids content, which contains about 2% of light stabilizer (4-acryloyloxy-1,2,2,6,6-pentamethylpiperidine), relative to the total solids content (=dispersion $D_1$).

EXAMPLE 2

A. 375 ml of methyl ethyl ketone are put into a 1.5 litre sulfonation flask fitted with a thermometer, stirrer, reflux condenser and nitrogen blanketing connection and heated to the reflux temperature (about 80° C.). In the course of 2 hours, a solution consisting of
- 184.0 g of methyl methacrylate,
- 20.5 g of methacrylic acid,
- 213.5 g of solution $B_1$, obtained according to Example 1, AII
- 2.15 g of azodiisobutyronitrile, 2.15 g of n-octylmercaptan and
10.4 g of 4-acryloyloxy-1,2,2,6,6-pentamethylpiperidine is added thereto. After the dropwise addition of the solution has been completed, a further 0.3 g of azodiisobutyronitrile is added and the solution is boiled under reflux for a further 2 hours. The solution is then diluted with 580 g of ®Solvesso 100 (alkane mixture, boiling range 162°–177° C.) and about 40 g of solvent mixture are distilled off. This gives a solution of about 30% solids content. The content of light stabilizer (4-acryloyloxy-1,2,2,6,6-pentamethylpiperidine) is about 2.5%, relative to the solids content (solution $C_2$).

B. The procedure followed is exactly as in Example 1, with the only exception that, in step B, the same quantity of solution $C_2$ is used in place of solution $C_1$. This gives a homogeneous, highly viscous polymethacrylate microparticle dispersion of about 40% solids content, which contains about 2.1% of light stabilizer, relative to the total solids content (= dispersion $D_2$).

EXAMPLE 3

Example 1B is repeated, but with the difference that the same quantity of solution $C_2$ is used in place of solution $C_1$ and the 9.0 g of 4-acryloyloxy-1,2,2,6,6-pentamethylpiperidine are omitted. This likewise gives a homogeneous, viscous polymethacrylate microparticle dispersion of about 40% solids content, which contains about 0.1% of light stabilizer (4-acryloyloxy-1,2,2,6,6-pentamethylpiperidine), relative to the total solids content (= dispersion $D_3$).

EXAMPLE 4

284 ml of ®Solvesso 100 (alkane mixture, d=0.85, boiling point 162°–177° C.) and 464 ml of xylene are put into a 1.5 litre sulfonation flask fitted with a thermometer, stirrer, reflux condenser, nitrogen blanketing connection and dropping funnel. The mixture is heated to 95° C. A solution consisting of
19.4 g of methyl methacrylate,
0.4 g of methacrylic acid,
1.6 g of azodiisobutyronitrile and
7.2 g of solution $C_1$ (obtained according to Example 1, A)
is added thereto. The mixture is stirred for 30 minutes at 55° C. The following solution is added dropwise in the course of 3 hours at 95° C. to the clear solution:
330.4 g of methyl methacrylate,
3.8 g of methacrylic acid,
56.9 g of glycidyl methacrylate,
5.0 g of azodiisobutyronitrile,
67.6 g of solution $C_1$ (obtained according to Example 1, A),
0.8 g of dimethylaminoethanol and
9.0 g of 2-{2-hydroxy-3-tert-butyl-5-[2-(2-acryloyloxycyclohexyloxycarbonyl)-ethyl]-phenyl}-benzotriazole.

With the progress of the dropwise addition, the viscosity of the reaction mixture increases. After the dropwise addition, the mixture is stirred for a further 10 minutes at 95° C. and then cooled to room temperature. This gives a homogeneous, highly viscous polymethacrylate microparticle dispersion of about 40% solids content, which contains 2% of the benzotriazole light stabilizer, relative to the total solids content (= dispersion $D_4$).

EXAMPLE 5

A. 375 ml of methyl ethyl ketone are put into a 1.5 litre sulfonation flask fitted with a thermometer, stirrer, reflux condenser and nitrogen blanketing connection and heated to the reflux temperature (about 80° C.). In the course of 2 hours, a solution consisting of
184.0 g of methyl methacrylate,
20.5 g of methacrylic acid,
213.5 g of solution $B_1$, obtained according to Example 1, AII,
2.15 g of azodiisobutyronitrile,
2.15 g of n-octylmercaptan and
10.4 g of 2- 2-hydroxy-3-tert-butyl-5-[2-(2-acryloyloxycyclohexyloxycarbonyl)-ethyl]-phenyl -benzotriazole is added thereto. After the dropwise addition of the solution has been completed, a further 0.3 g of azodiisobutyronitrile is added and the solution is boiled for a further 2 hours under reflux. The solution is then diluted with 580 g of ®Solvesso 100 (alkane mixture, boiling range 162°–177° C.) and about 44 g of solvent mixture are distilled off. This gives a solution of about 30% solids content. The light stabilizer content (benzotriazole UV absorber) is about 2.5%, relative to the solids content (= solution $C_3$).

B. The procedure followed is exactly as in Example 4, with the only difference that the same quantity of solution $C_3$ is used in place of solution $C_1$. This gives a homogeneous, viscous polymethacrylate microparticle dispersion of about 40% solids content, which contains about 2.1% of light stabilizer (benzotriazole UV absorber), relative to the total solids content (= dispersion $D_5$).

EXAMPLE 6

The procedure followed is as described in Example 4, but with the difference that the same quantity of solution $C_3$ is used in place of solution $C_1$ and the 9.0 g of 2-(2-hydroxy-3-tert-butyl-5-[2-(2-acryloyl-oxycyclohexyloxy-carbonyl)-ethyl]-phenyl}-benzotriazole are omitted. This gives a homogeneous, viscous polymethacrylate microparticle dispersion, which contains free epoxy groups in the microparticles, having a solids content of about 40% and containing about 0.1% of benzotriazole UV absorber, relative to the total solids content (= dispersion $D_6$).

EXAMPLE 7

Following the procedure as described in Example 1B, but using solution $C_3$ in place of solution $C_1$, a viscous, homogeneous polymethacrylate microparticle dispersion is likewise obtained, the microparticles containing free epoxy groups, the dispersion having a solids content of about 40% and containing about 2.1% of light stabilizer (0.1% of benzotriazole UV absorber and about 2% of 4-acryloyloxy-1,2,2,6,6-pentamethylpiperidine), relative to the total solids content (= dispersion $D_7$).

EXAMPLE 8

The procedure followed is as described in Example 4, but with the difference that solution $C_2$ is used in place of solution $C_1$. This likewise gives a viscous, homogeneous polymethacrylate microparticle dispersion, wherein the microparticles contain free epoxy groups, having a solids content of about 40% and containing about 2.1% of light stabilizer (about 0.1% of 4-acryloyloxy- 1,2,2,6,6-pentamethylpiperidine and about 2% of 2-2-hydroxy-3-tert-butyl-5-[2-(2-acryloyloxycyclohexyloxycarbonyl)ethyl]-phenyl -benzotriazole), relative to the total solids content (= dispersion $D_8$).

EXAMPLE 9

A. The procedure followed is exactly as in Example 2A, with the only difference that 250.5 g of 4-acryloyloxy-1,2,2,6,6-pentamethylpiperidine are employed in place of the 10.4 g used there. This gives a solution of about 30% solids content. The light stabilizer content (4-acryloyloxy1,2,2,6,6-pentamethylpiperidine) is about 38%, relative to the solids content (= solution $C_4$).

B. Example 1B is repeated, with the difference that the same quantity of solution $C_4$ is used in place of solution $C_1$ and the 9.0 g of 4-acryloyl-oxy-1,2,2,6,6-pentamethylpiperidine are omitted. This gives a homogeneous viscous polymethacrylate microparticle dispersion of about 40% solids content, which contains about 3% of light stabilizer (4-acryloyl-oxy-1,2,2,6,6-pentamethylpiperidine), relative to the total solids content (= dispersion $D_9$).

EXAMPLE 10

A. The procedure followed is exactly as in Example 5A, with the only difference that 250.5 g of 2- 2-hydroxy-3-tert-butyl-5-[2-(2-acryloyloxy- cyclohexyloxy-carbonyl)-ethyl]-phenyl -benzotriazole are employed in place of the 10.4 g used there. This gives a solution of about 30% solids content. The light stabilizer content (benzotriazole UV absorber) is about 38%, relative to the solids content (= solution $C_5$).

B. The procedure followed is as described in Example 4, but with the difference that the same quantity of solution $C_5$ is used in place of solution $C_1$ and the 9.0 g of 2-{2-hydroxy-3-tert-butyl-5-[2-(2-acryloyloxy-cyclohexyloxy-carbonyl)-ethyl]-phenyl}-benzotriazole are omitted. This gives a homogeneous, viscous polymethacrylate microparticle dispersion of about 40% solids content, which contains about 3% of benzotriazole UV absorber, relative to the total solids content (= dispersion $D_{10}$).

EXAMPLE 11

1,000 ml of xylene are heated to 80° C. under nitrogen in a 1.5 litre sulfonation flask fitted with a thermometer, stirrer, reflux condenser, nitrogen blanketing connection and dropping funnel. A mixture consisting of
  19.4 g of methyl methacrylate,
  0.4 g of methacrylic acid,
  7.2 g of solution $C_5$, obtained according to Example 10A,
  1.2 g of 4-acryloyloxy-1,2,2,6,6-pentamethylpiperidine and
  1.6 g of azodiisobutyronitrile
is added thereto all at once and the mixture is stirred for 30 minutes at 80° C. In the course of 90 minutes, the following mixture is added dropwise to this clear solution still at 80° C:
  330.4 g of methyl methacrylate,
  3.8 g of methacrylic acid,
  56.9 g of glycidyl methacrylate,
  67.6 g of solution $C_5$,
  12.4 g of 4-acryloyloxy-1,2,2,6,6-pentamethylpiperidine,
  5.0 g of azodiisobutyronitrile and
  0.8 g of dimaethylaminoethanol.

After the dropwise addition, stirring is continued for 10 minutes at 80° C. and about 120 g of solvent are then distilled off under a slight vacuum. This gives a homogeneous, viscous polymethacrylate microparticle dispersion of about 35% solids content, which contains about 3% of benzotriazole UV absorber (according to Example 10A) and about 3% of 4-acryloyl-oxy-1,2,2,6,6-pentamethylpiperidine, each relative to the total solids content (= dispersion $D_{11}$).

EXAMPLE 12

1,000 ml of xylene are heated to 80° C. under nitrogen in a 1.5 litre sulfonation flask fitted with a thermometer, stirrer, reflux condenser, nitrogen blanketing connection and dropping funnel. A mixture consisting of
  19.4 g of methyl methacrylate,
  0.4 g of methacrylic acid,
  7.2 g of solution $C_4$, obtained according to Example 9A,
  1.2 g of 2- 2-hydroxy-3-tert-butyl-5-[2-(2-acryloyloxycyclohexyloxycarbonyl)-ethyl]phenyl -benzotriazole and
  1.6 g of azodiisobutyronitrile
is added thereto all at once and the mixture is stirred for 30 minutes at 80° C. In the course of 90 minutes, the following mixture is added dropwise to this clear solution still at 80° C.:
  330.4 g of methyl methacrylate,
  3.8 g of methacrylic acid,
  56.9 g of glycidyl methacrylate,
  67.6 g of solution $C_4$,
  12.4 g of 2-{2-hydroxy-3-tert-butyl-5-[2-(2-acryloyloxycyclohexyloxycarbonyl)-ethyl]-phenyl}-benzotriazole,
  5.0 g of azodiisobutyronitrile and
  0.8 g of dimethylaminoethanol.

After the dropwise addition, stirring is continued for 10 minutes at 80° C. and about 120 g of solvent are then distilled off under a slight vacuum. This gives a homogeneous, viscous polymethacrylate microparticle dispersion of about 35% solids content, which contains about 3% of piperidine light stabilizer according to Example 9A and about 3% of benzotriazole UV absorber(2-{2-hydroxy-3-tert-butyl-5-[2-(2-acryloyloxycyclohexyloxy-carbonyl)-ethyl]-phenyl}-benzotriazole), relative to the total solids content (= dispersion $D_{12}$).

EXAMPLE 13

The procedure followed is as described in Example 12, with the only difference that the two portions of 2-{2-hydroxy-3-tert-butyl-5-[2-(2-acryloyloxycyclohexyloxycarbonyl)-ethyl]-phenyl}-benzotriazole are increased from 1.2 g to 4.4 g and from 12.4 g to 44.8 g. This gives a homogeneous, viscous polymethacrylate microparticle dispersion, which contains free epoxy groups in the microparticles, has a solids content of about 40 and contains about 3% of the piperidine light stabilizer and about 10% of the benzotriazole UV absorber, relative to the total solids content (= dispersion $D_{13}$).

EXAMPLE 14

A. 79.0 g of methyl ethyl ketone are heated to reflux temperature in a 750 ml sulfonation flask fitted with a thermometer, stirrer, reflux condenser, dropping funnel and nitrogen blanketing connection. Within the course of 2 hours, a solution consisting of 45.0 g of solution B₁, obtained according to Example 1, AII,
38.8 g of methyl methacrylate,
4.4 g of methacrylic acid,
33.4 g of 2-{2-hydroxy-3-tert-butyl-5-[2-(2-acryloyloxycyclohexyloxycarbonyl)-ethyl]-phenyl}-benzotriazole,
16.7 g of 4-acryloyloxy-1,2,2,6,6-pentamethylpiperidine,
0.5 g of azodiisobutyronitrile,
0.5 g of n-octylmercaptan and
100.0 g of methyl ethyl ketone
is added thereto dropwise.

After the dropwise addition of the solution has been completed, a further 0.1 g of azodiisobutyronitrile is added and the solution is boiled under reflux for a further 2 hours. 100.0 g of methyl ethyl ketone are then distilled off, the contents of the flask are diluted with 123 g of Solvesso 100 (alkane mixture, boiling range 162°–177° C.) and about 10 g of solvent are again distilled off. This gives a solution of about 40% solids content. The content of benzotriazole UV absorber is about 25% and that of piperidine light stabilizer is about 13%, each relative to the solids content (= solution C₆).

B. 1,000 ml of xylene are heated to 80° C. under nitrogen in a 1.5 litre sulfonation flask fitted with a thermometer, stirrer, reflux condenser, nitrogen blanketing connection and dropping funnel. A mixture consisting of
19.4 g of methyl methacrylate,
0.4 g of methacrylic acid,
7.2 g of solution C₆,
2.8 g of 2-{2-hydroxy-3-tert-butyl-5-[2-(2-acryloyloxycyclohexyloxycarbonyl)-ethyl]-phenyl)-benzotriazole,
1.2 g of 4-acryloyloxy-1,2,2,6,6-pentamethylpiperidine and
1.6 g of azodiisobutyronitrile
is added thereto all at once and the mixture is stirred for 30 minutes at 80° C. In the course of 90 minutes, the following mixture is added dropwise to this clear solution still at 80° C:
330.4 g of methyl methacrylate,
3.8 g of methacrylic acid,
56.9 g of glycidyl methacrylate,
67.6 g of solution C₆,
31.6 g of 2-{2-hydroxy-3-tert-butyl-5-[2-(2-acryloyloxycyclohexyloxy L carbonyl)-ethyl]-phenyl}-benzotriazole,
13.6 g of 4-acryloyloxy-1,2,2,6,6-pentamethylpiperidine,
5.0 g of azodiisobutyronitrile and
0.8 g of dimethylaminoethanol.

After the dropwise addition, stirring is continued for 10 minutes at 80° C. and about 120 g of solvent are then distilled off under a slight vacuum. This gives a homogeneous, viscous polymethacrylate microparticle dispersion of about 40% solids content, which contains about 4% of piperidine light stabilizer and about 9% of benzotriazole UV absorber, relative to the total solids content (= dispersion D₁₄).

EXAMPLE 15

Preparation and application of a curable coating composition

The microparticle dispersions D₁ to D₁₄ containing free epoxy groups, as obtained according to Examples 1 to 14, are processed to give curable coating compositions. For this purpose, each of these dispersions is mixed with a functional acid group-containing acrylate resin (Synocure ® 8845 from Cray Valley) in a ratio corresponding to a solids ratio of 1:8. As a flow aid, 1.1%, relative to the acrylate resin, of a 20% Baysilon ® A solution and 0.55%, relative to the acrylate resin, of a 1% Baysilon ® A solution as a flow aid are added to the mixture.

The coating mixture thus obtained is diluted with 3:1 xylene/butyl acetate up to sprayability and sprayed onto a prepared aluminium sheet (coil coat, filler, silver-metallic base coat) and baked at 120° C. for 30 minutes. This gives a dry layer thickness of about 45 μm clear coat.

For comparison, a coating mixture is used which contains unstabilized microparticles (prepared without an addition of light stabilizer), but in other respects is prepared and applied in the same way as above.

The specimens are tested both by accelerated weathering (UVCON or Xenon Weatherometer from Atlas Corp.) and by outside weathering in Florida.

The stabilized specimens show markedly better gloss retention and longer freedom from cracks than the unstabilized comparison specimen.

What is claimed is:

1. Light-stabilized polymer microparticles having a particle size distribution of 0.01–20 μm, obtainable by copolymerization of (a) one or more ethylenically unsaturated monomeric compounds or/and one or more different monomers selected from the group comprising polyalcohols, polycarboxylic acids, hydroxycarboxylic acids, lactones, aminocarboxylic acids, aminoalcohols and polyamines, and (b) at least one epoxide compound which contains at least one further reactive group, essentially only the latter taking part in the copolymerization, so that the resulting microparticles contain free epoxy groups, which microparticles contain 0.1 to 30% by weight, relative to the monomers employed, of one or more light stabilizers, wherein at least part of the polymerization of the monomers is carried out in the presence of the light stabilizer.

2. Microparticles according to claim 1, wherein the light stabilizers have at least one reactive group for chemical bonding to the polymer.

3. Microparticles according to claim 2, wherein the reactive group is a hydroxyl, carboxyl, ester, amide or epoxy group or an ethylenic double bond.

4. Microparticles according to claim 1, wherein at least one compound from the group comprising sterically hindered amines is used as the light stabilizer.

5. Microparticles according to claim 4, wherein the light stabilizer used is a 2,2,6,6-tetraalkylpiperidine derivative which contains in its molecule at least one group of the formula I

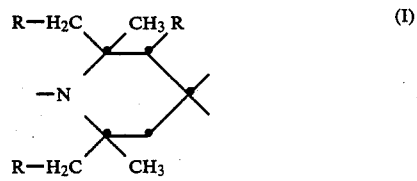

in which R is hydrogen or methyl.

6. Microparticles according to claim 1, wherein the light stabilizer is a UV absorber.

7. Microparticles according to claim 1, wherein a UV absorber and a sterically hindered amine are used as the light stabilizers.

8. Microparticles according to claim 7, wherein the UV absorber belongs to the class of 2-(2-hydroxyphenyl)-benzotriazoles.

9. Microparticles according to claim 1, wherein the polymer is an addition polymer.

10. Microparticles according to claim 9, wherein component (a) contains at least one ethylenically unsaturated compound and component (b) is an epoxide which contains at least one ethylenically unsaturated group.

11. Microparticles according to claim 1, which comprise a crosslinked core and assentially linear to slightly branched polymer chains polymerized thereon, the light stabilizers being contained in the core or/and in the polymer chains.

12. Microparticles according to claim 12, wherein the free epoxy groups are in the core, in the polymer chains polymerized thereon or in the core and in the polymer chains.

13. A process for the preparation of light-stabilized polymer microparticles having a particle size distribution of 0.01–20 μm, which comprises (a) copolymerizing one or several different ethylenically monounsaturated or polyunsaturated monomeric compounds or/and one or several different monomers from the group comprising polyalcohols, polycarboxylic acids, hydroxycarboxylic acids, lactones, aminocarboxylic acids, aminoalcohols and polyamines with (b) at least one epoxide compound which contains at least one further reactive group, in the presence of 0.1 to 30% by weight, relative to the monomers, of one or more light stabilizers in such a way that substantially only the said further reactive groups of the epoxide compound participates in the polymerization, so that the resulting microparticles contain free epoxy groups, and that at least a part of the resulting polymer is crosslinked, and, if the polymerization is carried out in several steps, at least one polymerization step taking place in the presence of the light stabilizers.

14. A process according to claim 13, which comprises
($a_1$) copolymerizing one or several different ethylenically monounsaturated or polyunsaturated monomeric compounds or/and one or several different monomers from the group comprising polyalcohols, polycarboxylic acids, hydroxycarboxylic acids and lactones with at least one epoxide compound, which contains at least one further reactive group, with crosslinking in such a way that substantially only the said further reactive groups of the epoxide compound participates in the polymerization, so that free epoxy groups remain,
($b_1$) polymerizing one or more of the monomers mentioned under ($a_1$) to give a substantially linear to branched polymer, which polymerization can also take place in the absence of the epoxide compound, and
($c_1$) polymerizing (grafting) the polymer obtained according to ($b_1$) onto the polymer obtained according to ($a_1$),
the polymerization according to ($a_1$) or according to ($b_1$) or both polymerizations being carried out in the presence of one or more light stabilizers, it being possible for the light stabilizers in the two polymerization steps to be identical or different, and the total quantity of light stabilizer being 0.1 to 30% by weight, relative to the monomers in both polymerization steps, it being possible for the polymerization ($a_1$) to take place wholly or partially in the presence of the polymer formed according to ($b_1$).

15. A process according to claim 13, which comprises
($a_1$) polymerizing one or several different ethylenically monounsaturated or polyunsaturated monomeric compounds or/and one or more different monomers from the group comprising polyalcohols, polycarboxylic acids, hydroxycarboxylic acids and lactones with crosslinking,
($b_1$) copolymerizing one or more of the monomers indicated under ($a_1$) with at least one epoxide compound, which contains at least one further reactive group, to give a substantially linear to branched polymer in such a way that substantially only the said further reactive groups of the epoxide compound participates in the polymerization, so that free epoxy groups remain, and
($c_1$) polymerizing (grafting) the polymer obtained according to ($b_1$) onto the polymer obtained according to ($a_1$),
the polymerization according to ($a_1$) or according to ($b_1$) or both polymerizations being carried out in the presence of one or more light stabilizers, and it being possible for the light stabilizers in the two polymerization steps to be identical or different and the total quantity of light stabilizer being 0.1 to 30% by weight, relative to the monomers, in both polymerization steps, and it being possible for the polymerization ($a_1$) to take place wholly or partially in the presence of the polymer formed according to ($b_1$).

16. A dispersion, containing light-stabilized polymer microparticles according to claim 1 and at least one solvent in which the polymer microparticles are substantially insoluble.

17. A dispersion according to claim 16 which, as the solvent, contains water or an aliphatic, cycloaliphatic or aromatic hydrocarbon or mixtures of these solvents.

18. A coating composition, wherein the film-forming material comprises
(a) 1 to 95% by volume of a disperse phase which contains microparticles according to claim 1, and
(b) 99 to 5% by volume of a liquid continuous phase which has a viscosity of 0.1 to 30 poise at room temperature and is capable of curing together with the disperse phase to give a film-forming polymer, the total volume of (a) and (b) being 100% and the disperse phase participating in curing the coating.

19. A coating composition according to claim 18, wherein the film-forming material comprises (a) 5–85% by volume of the disperse phase containing at least 50% by volume of microparticle according to the invention, and (b) 95–15% by volume of the liquid continuous phase having a viscosity of 0.1 to 20 poise at room temperature.

20. A coating composition according to claim 19, wherein the continuous phase (b) also contains one or more light stabilizers.

21. A coating composition according to claim 18, wherein the liquid continuous phase (b) contains a thermosetting resin.

22. A coating composition according to claim 21, wherein the resin is a crosslinkable acrylic resin, polyester/alkyd resin or polyurethane resin, which may be crosslinked with aminoplasts, polyisocyanate or polyepoxides.

23. A coating composition according to claim 18, wherein the liquid continuous phase (b) contains a reactive diluent which is itself not curable but contains reactive groups, by means of which it can participate in the curing of the film-forming material.

* * * * *